(12) United States Patent
Brunet et al.

(10) Patent No.: US 8,195,444 B2
(45) Date of Patent: *Jun. 5, 2012

(54) SYSTEMS AND METHODS FOR AUTOMATED DIAGNOSIS AND REPAIR OF STORAGE DEVICES

(75) Inventors: Jeffrey Brunet, Richmond Hill (CA); Ian Collins, Markham (CA); Yousuf Chowdhary, Maple (CA); Eric Li, Scarborough (CA)

(73) Assignee: Storage Appliance Corporation, Richmond Hill (CA)

( * ) Notice: Subject to any disclaimer, the term of this patent is extended or adjusted under 35 U.S.C. 154(b) by 877 days.

This patent is subject to a terminal disclaimer.

(21) Appl. No.: 11/699,877

(22) Filed: Jan. 29, 2007

(65) Prior Publication Data

US 2007/0124130 A1 May 31, 2007

Related U.S. Application Data

(60) Continuation-in-part of application No. 11/506,386, filed on Aug. 18, 2006, now Pat. No. 7,818,160, which is a division of application No. 11/492,380, filed on Jul. 24, 2006, now Pat. No. 7,813,913.

(60) Provisional application No. 60/725,225, filed on Oct. 12, 2005, provisional application No. 60/814,687, filed on Jun. 19, 2006, provisional application No. 60/817,540, filed on Jun. 30, 2006, provisional application No. 60/762,823, filed on Jan. 30, 2006.

(51) Int. Cl.
*G06F 9/455* (2006.01)
(52) U.S. Cl. ............................................ 703/24; 710/62
(58) Field of Classification Search ..................... 703/13, 703/24, 25; 710/62, 313, 8, 10; 711/162, 711/E12.103; 707/654, E17.005
See application file for complete search history.

(56) References Cited

U.S. PATENT DOCUMENTS

| | | | |
|---|---|---|---|
| 5,212,784 A | 5/1993 | Sparks | |
| 5,666,215 A | 9/1997 | Fredlund et al. | |
| 5,835,759 A | 11/1998 | Moore et al. | |
| 5,959,280 A | 9/1999 | Kamitani | |
| 5,960,411 A | 9/1999 | Hartman et al. | |

(Continued)

FOREIGN PATENT DOCUMENTS

EP 1168322 A1 1/2002

(Continued)

OTHER PUBLICATIONS

Scott Clark, "U3—Official Portable USB Apps Platform", Oct. 13, 2005, Everything USB website via Archive.org, <www.everythingusb.com/u3.html>, pp. 1-5.*

(Continued)

*Primary Examiner* — Russell Frejd
(74) *Attorney, Agent, or Firm* — Gard & Kaslow LLP

(57) ABSTRACT

A peripheral electronic device includes a health check application configured to execute automatically upon connection of the peripheral device to a data source, such as a personal computer. The health check application can diagnose problems and if necessary, repair the problems with the peripheral device, the data source, or both. Examples of problems include corrupted data and indications of software, firmware, and hardware failures or impending failures. In some instances, the health check application can provide a warning of an impending failure. The health check application, after initially executing, can be triggered in various ways to scan again for problems. In addition to finding and repairing problems, the health check application can also attend to maintenance.

10 Claims, 10 Drawing Sheets

U.S. PATENT DOCUMENTS

| | | |
|---|---|---|
| 6,119,153 A | 9/2000 | Dujari et al. |
| 6,131,148 A | 10/2000 | West |
| 6,282,710 B1 | 8/2001 | Boehler |
| 6,401,214 B1 | 6/2002 | Li |
| 6,405,362 B1 | 6/2002 | Shih et al. |
| 6,411,943 B1 | 6/2002 | Crawford |
| 6,469,967 B1 | 10/2002 | Mau |
| 6,473,794 B1 | 10/2002 | Guheen |
| 6,477,575 B1 | 11/2002 | Koeppel et al. |
| 6,487,558 B1 | 11/2002 | Hitchcock |
| 6,488,581 B1 | 12/2002 | Stockdale |
| 6,496,979 B1 | 12/2002 | Chen et al. |
| 6,505,236 B1 | 1/2003 | Pollack |
| 6,529,992 B1 | 3/2003 | Thomas et al. |
| 6,567,273 B1 | 5/2003 | Liu |
| 6,588,662 B1 | 7/2003 | Hu |
| 6,603,676 B2 | 8/2003 | Kitagawa |
| 6,606,644 B1 | 8/2003 | Ford et al. |
| 6,609,173 B1 | 8/2003 | Watkins |
| 6,611,850 B1 | 8/2003 | Shen |
| 6,654,797 B1 | 11/2003 | Kamper |
| 6,684,229 B1 | 1/2004 | Luong et al. |
| 6,701,456 B1 | 3/2004 | Biessener |
| 6,731,536 B1 | 5/2004 | McClain et al. |
| 6,751,681 B2 | 6/2004 | Torii et al. |
| 6,813,682 B2 | 11/2004 | Bress et al. |
| 6,813,725 B1 | 11/2004 | Hanes |
| 6,832,107 B2 | 12/2004 | Mashiko |
| 6,839,721 B2 | 1/2005 | Schwols |
| 6,845,464 B2 | 1/2005 | Gold |
| 6,856,425 B2 | 2/2005 | Ozawa et al. |
| 6,868,227 B2 | 3/2005 | Luman |
| 6,876,461 B2 | 4/2005 | Usami |
| 6,879,988 B2 | 4/2005 | Basin et al. |
| 6,889,376 B1 | 5/2005 | Barritz |
| 6,898,517 B1 | 5/2005 | Froeberg |
| 6,901,493 B1 | 5/2005 | Maffezzoni |
| 6,943,681 B2 | 9/2005 | Rezvani et al. |
| 6,976,253 B1 | 12/2005 | Wierman et al. |
| 6,985,248 B2 | 1/2006 | Parulski et al. |
| 6,986,030 B2 | 1/2006 | Shmueli et al. |
| 6,993,760 B2 | 1/2006 | Peev et al. |
| 7,017,155 B2 | 3/2006 | Peev et al. |
| 7,024,529 B2 | 4/2006 | Yamada |
| 7,054,260 B2 | 5/2006 | Rilum et al. |
| 7,054,594 B2 | 5/2006 | Bloch et al. |
| 7,095,519 B1 | 8/2006 | Stewart |
| 7,111,121 B2 | 9/2006 | Oishi et al. |
| 7,136,288 B2 | 11/2006 | Hoogerdijk |
| 7,137,034 B2 | 11/2006 | Largman |
| 7,162,500 B2 | 1/2007 | Iguchi |
| 7,165,082 B1 | 1/2007 | DeVos |
| 7,200,546 B1 | 4/2007 | Nourmohamadian |
| 7,207,033 B2 | 4/2007 | Kung |
| 7,213,766 B2 | 5/2007 | Ryan et al. |
| 7,266,668 B2 | 9/2007 | Hartung |
| 7,302,538 B2 | 11/2007 | Liu |
| 7,305,577 B2 | 12/2007 | Zhang |
| 7,308,528 B2 | 12/2007 | Kitamura |
| 7,330,997 B1 | 2/2008 | Odom |
| 7,334,226 B2 | 2/2008 | Ramachandran et al. |
| 7,363,510 B2 | 4/2008 | Bobrow |
| 7,401,194 B2 | 7/2008 | Jewell |
| 7,461,144 B1 | 12/2008 | Beloussov |
| 7,519,767 B2 | 4/2009 | Slater |
| 7,558,928 B1 | 7/2009 | DeVos |
| 7,606,946 B2 | 10/2009 | Kobayashi et al. |
| 7,739,429 B2 | 6/2010 | Shih |
| 7,761,456 B1 | 7/2010 | Cram et al. |
| 7,818,160 B2 | 10/2010 | Collins et al. |
| 2001/0047389 A1 | 11/2001 | Prahlad et al. |
| 2001/0056425 A1 | 12/2001 | Richard |
| 2002/0023198 A1 | 2/2002 | Kokubun et al. |
| 2002/0026575 A1 | 2/2002 | Wheeler et al. |
| 2002/0036850 A1 | 3/2002 | Lenny et al. |
| 2002/0063889 A1 | 5/2002 | Takemoto et al. |
| 2002/0064111 A1 | 5/2002 | Horie |
| 2002/0083085 A1 | 6/2002 | Davis et al. |
| 2002/0112171 A1 | 8/2002 | Ginter et al. |
| 2002/0143637 A1 | 10/2002 | Shmueli et al. |
| 2002/0147912 A1 | 10/2002 | Shmueli et al. |
| 2002/0162009 A1 | 10/2002 | Shmueli et al. |
| 2002/0184115 A1 | 12/2002 | Mueller et al. |
| 2002/0184459 A1 | 12/2002 | Taussig et al. |
| 2002/0184559 A1 | 12/2002 | Qin et al. |
| 2002/0188566 A1 | 12/2002 | Inchalik et al. |
| 2002/0191788 A1 | 12/2002 | Inchalik et al. |
| 2002/0196729 A1 | 12/2002 | Fairman et al. |
| 2002/0196940 A1 | 12/2002 | Isaacson et al. |
| 2003/0011809 A1 | 1/2003 | Suzuki et al. |
| 2003/0048735 A1 | 3/2003 | Sawada et al. |
| 2003/0050940 A1 | 3/2003 | Robinson |
| 2003/0058763 A1 | 3/2003 | Noda |
| 2003/0069750 A1 | 4/2003 | Siegel et al. |
| 2003/0074529 A1 | 4/2003 | Crohas |
| 2003/0105643 A1 | 6/2003 | Chen et al. |
| 2003/0120740 A1 | 6/2003 | Beeman et al. |
| 2003/0149662 A1 | 8/2003 | Shore |
| 2003/0156341 A1 | 8/2003 | Ito |
| 2003/0163610 A1 | 8/2003 | Stevens |
| 2003/0182471 A1 | 9/2003 | Harris et al. |
| 2003/0190137 A1 | 10/2003 | Pesce |
| 2003/0195737 A1* | 10/2003 | Shapiro et al. .................. 703/24 |
| 2003/0225971 A1 | 12/2003 | Oishi et al. |
| 2003/0233525 A1 | 12/2003 | Reeves |
| 2004/0008209 A1 | 1/2004 | Adams et al. |
| 2004/0044863 A1 | 3/2004 | Trimmer et al. |
| 2004/0078514 A1 | 4/2004 | Kung et al. |
| 2004/0083473 A1 | 4/2004 | Thomas et al. |
| 2004/0088456 A1 | 5/2004 | Zhang |
| 2004/0145988 A1 | 7/2004 | Watanabe |
| 2004/0153614 A1 | 8/2004 | Bitner et al. |
| 2004/0167941 A1 | 8/2004 | Prahlad et al. |
| 2004/0172427 A1 | 9/2004 | Thomas et al. |
| 2004/0172489 A1 | 9/2004 | Shikada |
| 2004/0184174 A1 | 9/2004 | Woo |
| 2004/0193744 A1* | 9/2004 | Paley et al. ...................... 710/5 |
| 2004/0199600 A1 | 10/2004 | Dorundo et al. |
| 2004/0230653 A1 | 11/2004 | Liao |
| 2004/0230708 A1 | 11/2004 | Juan |
| 2004/0230863 A1 | 11/2004 | Buchhorn |
| 2004/0243745 A1 | 12/2004 | Bolt |
| 2005/0010835 A1 | 1/2005 | Childs et al. |
| 2005/0015536 A1 | 1/2005 | Lee |
| 2005/0015559 A1 | 1/2005 | Shen et al. |
| 2005/0021880 A1 | 1/2005 | Robbin et al. |
| 2005/0027956 A1 | 2/2005 | Tormasov et al. |
| 2005/0033911 A1 | 2/2005 | Kitamura et al. |
| 2005/0052548 A1 | 3/2005 | Delaney |
| 2005/0060356 A1 | 3/2005 | Saika |
| 2005/0071524 A1 | 3/2005 | Liu et al. |
| 2005/0080973 A1 | 4/2005 | Lee |
| 2005/0081006 A1 | 4/2005 | Shackelford et al. |
| 2005/0083741 A1 | 4/2005 | Chang et al. |
| 2005/0086326 A1 | 4/2005 | Manning et al. |
| 2005/0114450 A1 | 5/2005 | DeVos |
| 2005/0157315 A1 | 7/2005 | Kato |
| 2005/0157603 A1 | 7/2005 | Tseng |
| 2005/0174676 A1 | 8/2005 | Lin |
| 2005/0182872 A1 | 8/2005 | Shih |
| 2005/0193235 A1 | 9/2005 | Sandorfi et al. |
| 2005/0193389 A1 | 9/2005 | Murphy et al. |
| 2005/0210080 A1 | 9/2005 | Saika |
| 2005/0213146 A1 | 9/2005 | Parulski |
| 2005/0216746 A1 | 9/2005 | Saika |
| 2005/0216794 A1 | 9/2005 | Yagawa |
| 2005/0226059 A1 | 10/2005 | Kavuri et al. |
| 2005/0228836 A1 | 10/2005 | Bacastow |
| 2005/0245249 A1 | 11/2005 | Wierman et al. |
| 2005/0246583 A1 | 11/2005 | Robinson |
| 2005/0253554 A1 | 11/2005 | DiFazio et al. |
| 2005/0268339 A1 | 12/2005 | Bobrow |
| 2005/0278432 A1 | 12/2005 | Feinleib et al. |
| 2006/0010078 A1 | 1/2006 | Rezvani et al. |
| 2006/0010285 A1 | 1/2006 | Georgis |
| 2006/0031289 A1 | 2/2006 | Experton |
| 2006/0036553 A1 | 2/2006 | Gupta et al. |

| | | | |
|---|---|---|---|
| 2006/0041639 A1 | 2/2006 | Lamkin et al. | |
| 2006/0059308 A1 | 3/2006 | Uratani et al. | |
| 2006/0069921 A1 | 3/2006 | Camaisa et al. | |
| 2006/0075293 A1 | 4/2006 | Bodlaender | |
| 2006/0080521 A1 | 4/2006 | Barr et al. | |
| 2006/0101191 A1 | 5/2006 | Pinson | |
| 2006/0123189 A1 | 6/2006 | Bitner et al. | |
| 2006/0143376 A1 | 6/2006 | Matze et al. | |
| 2006/0161635 A1 | 7/2006 | Lamkin et al. | |
| 2006/0161802 A1 | 7/2006 | Wang et al. | |
| 2006/0164891 A1 | 7/2006 | Mills | |
| 2006/0179448 A1 | 8/2006 | Smith et al. | |
| 2006/0190722 A1 | 8/2006 | Sharma et al. | |
| 2006/0198202 A1 | 9/2006 | Erez | |
| 2006/0200623 A1 | 9/2006 | Gonzalez et al. | |
| 2006/0218435 A1 | 9/2006 | van Ingen et al. | |
| 2006/0224846 A1 | 10/2006 | Amarendran et al. | |
| 2006/0289642 A1 | 12/2006 | Huang et al. | |
| 2007/0006017 A1 | 1/2007 | Thompson et al. | |
| 2007/0043888 A1 | 2/2007 | Suzuki et al. | |
| 2007/0043889 A1 | 2/2007 | Sanada et al. | |
| 2007/0043973 A1 | 2/2007 | Schneider | |
| 2007/0083354 A1 | 4/2007 | Collins et al. | |
| 2007/0159940 A1 | 7/2007 | Ijtsma et al. | |
| 2007/0179955 A1 | 8/2007 | Croft et al. | |
| 2007/0214332 A1 | 9/2007 | Sonoda et al. | |
| 2007/0250655 A1* | 10/2007 | Ferchau et al. | 710/313 |
| 2008/0133827 A1 | 6/2008 | Topham et al. | |
| 2008/0215873 A1 | 9/2008 | Bobrow | |

FOREIGN PATENT DOCUMENTS

| | | |
|---|---|---|
| EP | 1233409 A2 | 8/2002 |
| EP | 1717697 A2 | 11/2006 |
| WO | WO 00/19294 | 4/2000 |
| WO | WO 01/27768 | 4/2001 |
| WO | WO 01/84265 | 11/2001 |
| WO | WO 02/18009 | 3/2002 |
| WO | WO 02/39231 | 5/2002 |
| WO | WO 03/014933 | 2/2003 |
| WO | WO 03/048944 | 6/2003 |
| WO | WO 2004/067286 | 8/2004 |
| WO | 2005086002 A1 | 9/2005 |
| WO | WO 2007/041849 | 4/2007 |
| WO | WO 2007/041850 | 4/2007 |

OTHER PUBLICATIONS

Seagate, "Enhanced Drive Self-Test—Winning the War Against Unnecessary Drive Returns", Jun. 2000, Seagate, pp. 1-4.*
U.S. Appl. No. 11/492,380, Ian Collins, Emulation Component for Data Backup Applications, filed Jul. 24, 2006.
U.S. Appl. No. 11/546,263, Jeffrey Brunet, Optical Disc for Simplified Data Backup, filed Oct. 10, 2006.
U.S. Appl. No. 11/506,386, Ian Collins, Data Backup Devices and Methods for Backing Up Data, filed Aug. 18, 2006.
U.S. Appl. No. 11/546,176, Jeffrey Brunet, Optical Disc Initiated Data Backup, filed Oct. 10, 2006.
U.S. Appl. No. 11/605,770, Jeffrey Brunet, Data Backup System Including a Data Protection Component, filed Nov. 28, 2006.
U.S. Appl. No. 11/704,802, Jeffrey Brunet, Systems and Methods for Selectively Copying Embedded Data Files, filed Feb. 8, 2007.
U.S. Appl. No. 11/715,008, Jeffrey Brunet, Systems and Methods for Selecting and Printing Data Files from a Backup System, filed Mar. 6, 2007.
U.S. Appl. No. 11/801,240, Jeffrey Brunet, Automatic Connection to an Online Service Provider from a Backup System, filed May 8, 2007.
U.S. Appl. No. 11/601,040, Jeffrey Brunet, Methods for Selectively Copying Data Files to Networked Storage and Devices for Initiating the Same, filed Nov. 16, 2006.
U.S. Appl. No. 12/006,606, Jeffrey Brunet, Systems and Methods for Providing Targeted Marketing, filed Jan. 3, 2008.
U.S. Appl. No. 11/998,096, Jeffrey Brunet, Systems and Methods for Backing Up User Settings, filed Nov. 27, 2007.
U.S. Appl. No. 11/906,646, Jeffrey Brunet, Methods of Bundling Credits with Electronic Devices and Systems for Implementing the Same, filed Oct. 2, 2007.
U.S. Appl. No. 11/977,885, Jeffrey Brunet, Systems and Methods for Controlling Production Quantities, filed Oct. 26, 2007.
U.S. Appl. No. 11/154,088, Ian Collins, Portable Data Backup Appliance, filed Jun. 15, 2005.
Mirra.com, "Frequently Asked Questions about Mirra" Feb. 2005, Mirra.com and Archive.org <http://web.archive.org/web/20050206184942/www.mirra.com/product/file_backup_guide.html>, pp. 1-5.
Mirra.com, "Why Mirra is Different . . . and Better" Feb. 2005, Mirra.com and Archive.org <http://web.archive.org/web/20050206192005/www.mirra.com/product/why_mirra_is_different.html>, p. 5.
Page 2 from the following web page archived on Jan. 25, 2005: http://web.archive.org/web/20050125085304/http://www.bjorn3d.com/read.php?cID=748.
Scott Clark, "U3—Official Portable USB Apps Platform", Oct. 12, 2005, Everything USB website via Archive.org, , www.everythingusb.com/u3.html>, pp. 1-5.
IBM, "Automatic Tape Backup of Customer's Critical Direct Access Storage Device Areas". IBM Technical Disclosure Bulletin, vol. 39, Issue 12, pp. 37-38. Dec. 1, 1996.
Wikipedia, "Image File Formats" Jul. 13, 2006, Wikipedia.org, p. 1-5.
Wikipedia, "Audio file format" Jul. 29, 2006, Wikipedia.org, p. 1-4.
Wikipedia, "MPEG-4 Part 14" Jun. 5, 2006, Wikipedia.org, p. 1-3.
"LapBack 1.9.8", CNET.com, Sep. 3, 2005.
"LapBack U3", Software Central, copyright 2005.
Rothman, Wilson, "Now It's Easy to Back Up Data on a Network," The New York Times, Mar. 30, 2006, http://www.nytimes.com.
TurnKey Technology Solutions, Apr. 10, 2007, http://www.turnkeytechnology.biz/.
Takahashi, Dean, "Backup Drive Fits in a Pocket," First Look, Tech Insider, San Jose Mercury News, Jun. 4, 2007, pp. 2E.
Wong, Nicole, "One Key Stroke Saves Your Data," First Look, Tech Insider, San Jose Mercury News, Apr. 2, 2007, pp. 2E.
Duryee, Tricia, "Store Your Digital Content on a Hard Drive in the Sky," Tech Monday, San Jose Mercury News, Jul. 3, 2006, pp. 5E.
Brown, Christopher L. T., "Analysis of the ATA Protected Area," Technical White Paper, TechPathways LLC, 2002, www.TechPathways.com.
Parvaneh, Marc K., "CDR-ROM™ Overview & Implementations," ODC White Paper, Optical Disc Corporation, pp. 1-9.
"Backup Drives Essential but Underused," Consumer Report, Sep. 2006, pp. 30-31.
"Enhanced Drive Self-Test—Winning the War Against Unnecessary Drive Returns," Executive Summary, Personal Storage Product Marketing, Jun. 2000, No. TP-302.1, Seagate.
Evans, Mark, "Hard Drive Self-Tests," Quantum Corporation, Apr. 26, 1999, T10/99-179 rev 0.
"Attachment Extractor for Outlook Express v. 1.5," Software , 2003-2008 NSoftware.
"Mailbox Fetch," Group Fetch, 2006 GroupFetch. com.
"Outlook, Outlook Express, and Windows Mail Attachment Tools . . . ," Outlook Attachment and Picture Extractor, 2006, OPE2000.com.
"Save Message," InboxRULES, Ornic USA, LLC, 1996-2007, ORNIC USA, LLC.
PCMag, "U3 Preview," Sep. 21, 2005.
U3, "U3 Smart Drive Computing Platform," Jun. 2005.
Brown University, "Image File Format" Jun. 22, 2006, www.archive.org <http://web.archive.org/web/20060622060840/http://cs.brown.edu/stc/summer/workshop/summer_formats.html>, p. 1-2.
Dr. Caroline Musselwhite et al., "AAC Intervention" 2005 <http://www.aacintervention.com/tipfive.html>, pp. 1-3.
Dr. Caroline Musselwhite et al., "About Graphics/Digital Images" AACIntervention, pp. 1-6, 2005.

* cited by examiner

SYSTEMS AND METHODS FOR AUTOMATED DIAGNOSIS AND REPAIR OF STORAGE DEVICES

CROSS-REFERENCE TO RELATED APPLICATIONS

This application is a Continuation-in-Part of U.S. Non-Provisional patent application Ser. No. 11/506,386 filed on Aug. 18, 2006 and entitled "Data Backup Devices and Methods for Backing up Data", now U.S. Pat. No. 7,818,160, which is a divisional application of U.S. Non-Provisional patent application Ser. No. 11/492,380 filed on Jul. 24, 2006 and entitled "Emulation Component for Data Backup Applications", now U.S. Pat. No. 7,813,913, which claims the benefit of U.S. Provisional Patent Application No. 60/725,225 filed on Oct. 12, 2005 and entitled "A Method, Apparatus and a System for Removable Media Device Emulation on an External Storage Device via an Emulation Component for the Purpose of an Electronic Data Backup Appliance, " U.S. Provisional Patent Application No. 60/814,687 filed on Jun. 19, 2006 and entitled "Portable Electronic Data Backup Appliance Based on Integrated Circuit (IC) Memory," and U.S. Provisional Patent Application No. 60/817,540 filed on Jun. 30, 2006 and entitled "Portable Data Backup Appliance for Utilizing a Recordable Media Burner Device;" this application also claims the benefit of U.S. Provisional Patent Application No. 60/762,823 filed on Jan. 30, 2006 and entitled "A Method and a Process for the Automated Self-Diagnosis and Repair of an Electronic Data Backup Appliance." Each of the aforementioned applications is incorporated herein by reference.

BACKGROUND OF THE INVENTION

1. Field of the Invention

The present invention relates generally to the field of digital data management and more particularly to systems for data backup applications.

2. Description of the Prior Art

Digital content, represented by digital data files of various file types, is rapidly replacing other forms of content. Documents, presentations, photos, movies, and music, for example, are increasingly produced and stored digitally. A problem for many individuals and organizations is that digital content, typically stored on a computer hard drive, can be poorly organized and needs to be archived to be protected against accidental loss. For example, digital photo files on a personal computer (PC) are likely to be found in numerous folders—photos transferred from a digital camera are stored in one set of folders, photos received as e-mail attachments are stored in other folders, and photos downloaded from websites are stored in still other folders.

One approach to archiving digital content is to periodically backup all of the data files on the computer, preserving the existing organizational structure. While this technique is effective to preserve digital content against accidental loss, the technique has several shortcomings. For one, the resulting copy is no better organized than the original, so misplaced or disorganized content remains misplaced or disorganized. Also, backing up all data files requires substantial memory capacity to copy numerous files that are otherwise already preserved elsewhere. Application specific files, for example, originally loaded onto the computer from a compact disc (CD) are already archived on the CD and therefore do not need to be backed up.

The necessary storage capacity for a complete backup can be obtained with writable data storage media, such as hard disc drives (HDDs), however, these require device installation and software set-up when first connected to a system. In order to complete these steps, a user may have to provide information about the existing system, which the user may not readily know. Also, the user may have to make decisions regarding the configuration of the device and the backup software. The number of steps involved with installation and set-up, as well as the complexity of some of the steps, dissuades many users from bothering with backup applications. The expense of a writable data storage media with enough capacity to perform a complete backup can also dissuade users from performing complete backups. Furthermore, some users, having bought and installed the necessary storage capacity, are dissuaded from performing frequent backups due to the length of time the system is tied up while performing a complete backup.

Alternately, a user can manually select a set of files from a directory and copy the selected files to a storage device. While this alternative may allow usage of a smaller memory device that does not require installation and set-up steps, manually selecting files is time-consuming. Also, manually selecting files creates the possibility of an accidental omission of some files.

Another issue with some existing data backup solutions is the reliability of the storage device on which the backed-up files have been saved. If data files are backed-up onto a HDD, for example, and the HDD later fails, the backed-up files may be unrecoverable.

What is needed, therefore, is the ability to selectively backup digital content in a manner that is inexpensive, convenient, and that provides enhanced storage device reliability by identifying and resolving or avoiding problems.

SUMMARY

An exemplary data backup system comprises a communication interface, a first storage device, and an emulation component. The first storage device includes a writable data storage medium comprising first and second logical storage areas, and in some embodiments the first logical storage area stores a data backup application. The emulation component is in communication between the first storage device and the communication interface. The emulation component comprises logic configured to represent the first logical storage area as an auto-launch device, and additional logic configured to represent the second logical storage area as a second storage device including a writable data storage medium. It will be appreciated that the logic of the emulation component can be implemented through software, hardware, firmware, or a combination thereof.

The emulation component of the exemplary data backup system can also comprise, in some embodiments, logic configured to receive auto-launch device commands from the communication interface, translate the auto-launch device commands to first storage device commands, and send the first storage device commands to the first logical storage area, and additional logic configured to receive first storage device responses from the first logical storage area, translate the first storage device responses into auto-launch device responses, and send the auto-launch device responses to the communication interface. The emulation component can further comprise logic configured to receive second storage device commands from the communication interface and send the second storage device commands to the second logical storage area, and additional logic configured to receive second storage device responses from the second logical storage area, and send the second storage device responses to the communication interface.

In some embodiments the first storage device comprises a HDD, and in some of these embodiments the first and second logical storage areas comprise first and second partitions of the HDD. In other embodiments the first storage device comprises solid-state memory or an optical device. Suitable solid state memories include any solid state memory that can be written at least once, including a Secure Digital (SD) memory card, a Compact Flash (CF) memory card, or a memory stick. Suitable optical devices include CD and Digital Video Disc (DVD) drives. Exemplary writable data storage media for these drives include Compact Disc-Recordable (CD-R) and Compact Disc ReWritable (CD-RW) media, and Digital Video Disc-Recordable (DVD-R and DVD+R) and Digital Video Disc ReWritable (DVD-RW and DVD+RW) media, respectively.

An exemplary method for backing up data stored on a data source comprises returning a response to an inquiry from the data source. The response identifies a first storage device of a first device type as instead being of a second device type. Here, the second device type belongs to a class of device types that, upon connection to the data source, will trigger an operating system of the data source to automatically execute a backup application stored on the first storage device. The exemplary method further comprises providing the backup application to the data source to selectively copy data stored on the data source. Providing the backup application includes receiving auto-launch device commands from the data source, translating the auto-launch device commands into first storage device commands, and sending the first storage device commands to the storage device. Providing the backup application also includes receiving first storage device responses from the first storage device, translating the first storage device responses into auto-launch device responses, and sending the auto-launch device responses to the data source.

In some embodiments, the method for backing up data stored on the data source also comprises selectively copying data files to a second storage device, and in some embodiments the first storage device comprises the second storage device. In other embodiments, selectively copying data files includes sending copied files to a web-based storage facility. Selectively copying data files can include searching one or more storage devices associated with the data source for data files that meet a predefined criterion, for example, that the data files have not previously been copied to a data backup system, or that the data files have a file type associated with a type of content. Selectively copying data files can also include creating a directory structure on the second storage device to indicate the location of a copied file on the data source. Selectively copying data files can further include determining whether a data source has been previously paired with a data backup system. Selectively copying data files can be initiated, in some embodiments, by a user command or by connecting a removable storage device to a communication port of a data backup system.

Another exemplary system of the invention comprises a communication interface, a first storage device including a writable data storage medium comprising first and second logical storage areas, and an emulation component in communication between the first storage device and the communication interface. The first logical storage area of the writable data storage medium includes computer-readable instructions of a health check application. The emulation component comprises logic configured to represent the first logical storage area as an auto-launch device, and logic configured to represent the second logical storage area as a second storage device including a writable data storage medium. In some embodiments; the first logical storage area further includes computer-readable instructions of a backup application. The system can also comprise a controller chip in communication between the first storage device and the communication interface. The controller chip can comprise firmware including additional computer-readable instructions of the health check application. In some embodiments the emulation component resides on the controller chip.

Another exemplary system of the invention comprises a communication interface, a first storage including computer-readable instructions of a health check application, and an emulation component in communication between the storage device and the communication interface. Here, the emulation component is configured to represent the storage device as an auto-launch device, receive auto-launch device commands from a data source addressed to the auto-launch device, translate the auto-launch device commands to storage device commands, and send the storage device commands to the storage device, and receive storage device responses from the storage device, translate the storage device responses into auto-launch device responses, and send the auto-launch device responses to the data source.

Another exemplary system of the invention comprises a communication interface, a storage device, a printed circuit board comprising a component in communication between the storage device and the communication interface and including computer-readable instructions of a health check application, and an emulation component in communication between the storage device and the communication interface. The emulation component is configured to represent the storage device as an auto-launch device, receive auto-launch device commands from a data source addressed to the auto-launch device, translate the auto-launch device commands to storage device commands, and send the storage device commands to the storage device, and receive storage device responses from the storage device, translate the storage device responses into auto-launch device responses, and send the auto-launch device responses to the data source. In some embodiments, the storage device comprises additional computer-readable instructions of the health check application.

Another exemplary method of the invention comprises automatically launching a health check application to run on a data source by connecting the data source to a system comprising a data storage device including computer-readable instructions of the health check application, gathering information about the system, and processing the information. In various embodiments, gathering information about the system includes obtaining from a log database historical information about the system, obtaining a manufacturer specification, obtaining real-time values, or obtaining user settings. Processing the information can comprise applying diagnostic rules, comparing a real-time value against a manufacturer specification, or determining the utility to perform the service on the system. In the latter instance, the service can comprise a repair or maintenance. The method can also comprise, in some embodiments, initiating a scan and storing a log file to a log database, displaying a warning on a display device of the data source, or gathering and processing information about the data source and running a utility to perform a service on the data source.

DETAILED DESCRIPTION OF THE INVENTION

A data backup system is provided for personal, as well as commercial, applications. The data backup system of the present invention allows files to be selectively copied from a data source, such as a personal computer, to a storage device according to some criteria such as file type. For example, the system can be configured to backup audio files having recognized music file extensions such as .mp3 and .wav, or image files having recognized image file extensions such as .jpg, .pct, and .tif. The data backup system, according to some embodiments, stores a backup application that automatically launches when the data backup system is connected to the data source. The backup application can be configured to require little or no user input to perform the backup process.

The data backup system can take a number of different forms. One example is an appliance that includes both the backup application and sufficient storage capacity for copied files. Another example is a device that includes the backup application and an interface for connecting sufficient storage capacity in the form of a storage device such as an external HDD or flash memory device. In both examples, the system includes an emulation component. The emulation component makes the portion of the data backup system that contains the backup application appear to the data source as if it were of a particular device type. More specifically, the backup application portion of the data backup system is represented as being one of a class of storage devices referred to herein as "auto-launch devices." Emulating an auto-launch device allows the data backup system to take advantage of automatic execution capabilities of certain operating systems so that the backup application will automatically be executed when the device is connected to a data source running the operating system.

Figure 1:
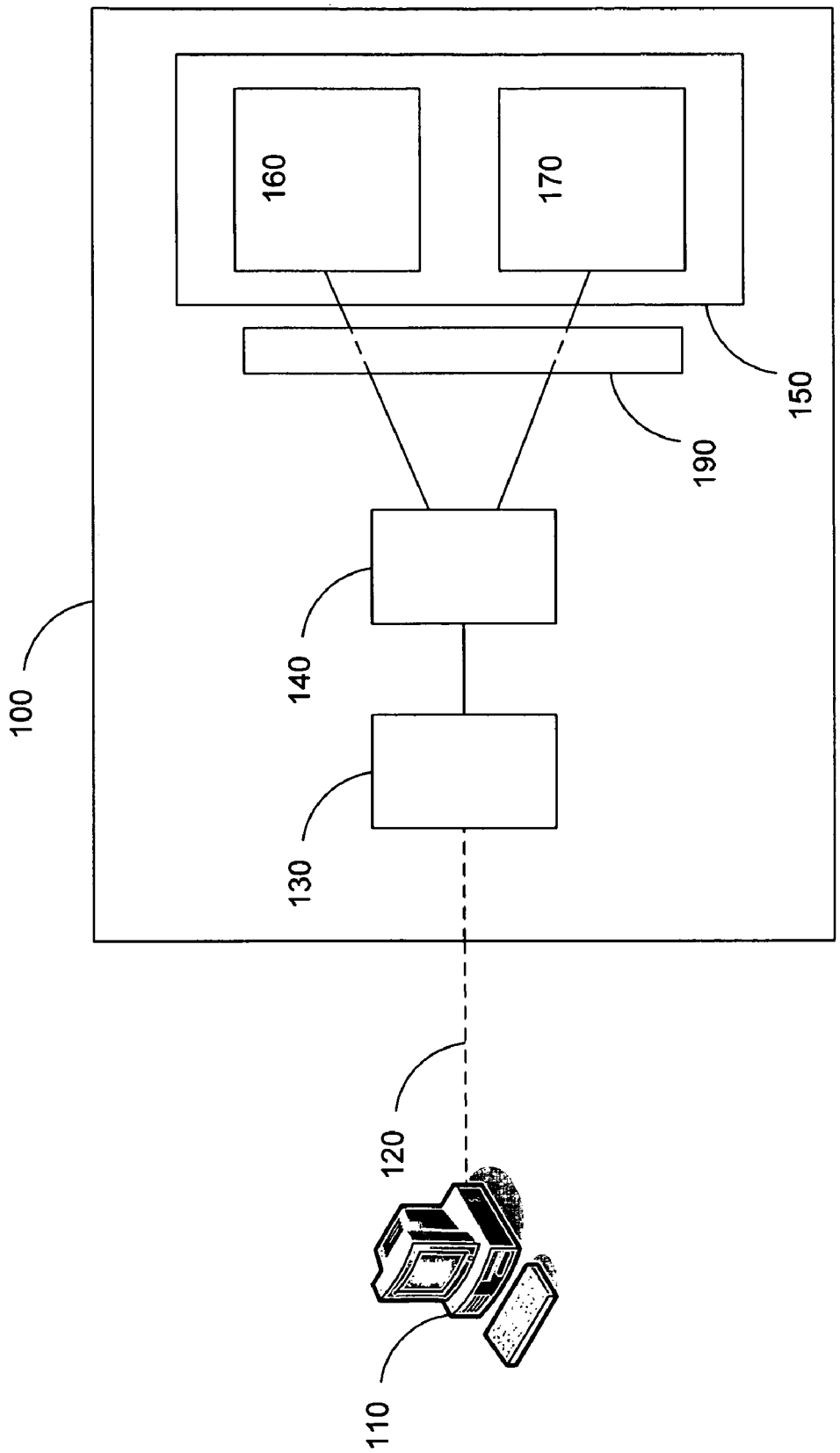
FIG. 1 is a schematic representation of a data backup system according to an exemplary embodiment of the present invention.

FIG. 1 provides a schematic representation of an exemplary embodiment of a data backup system 100 connected to a data source 110 by a connection 120. The data source 110 can be, for example, a personal computer (PC), a Macintosh computer (Mac), or a Personal Digital Assistant (PDA) on which data resides. The data source 110 can also comprise a server, a settop box, a television, a cellular telephone, a Smartphone, a digital still camera or video camera, a scanner, a digital music or video player, a game console, or a Personal Video Recorder (PVR). Preferably, the data source 100 includes an operating system (OS), such as Windows XP, that includes an automatic application launching function, as discussed in more detail elsewhere herein. Other suitable operating systems include MacOS, PalmOS, Linux, and Unix, for example. The connection 120 between the backup system 100 and the data source 110 can be essentially any data transfer mechanism such as an optical or electrical cable, a wireless link, or a network connection. The connection 120 is shown with a dashed line in FIG. 1 to indicate that the connection 120 need only be temporary.

As shown in FIG. 1, the backup system 100 comprises a communication interface 130, an emulation component 140, and a storage device 150 that includes a first logical storage area 160 and second logical storage area 170. The communication interface 130 allows the data source 110 to communicate with the emulation component 140 of the backup system 100 according to a communication protocol. The communication interface 130 can be, for example, USB, FireWire, or a wireless interface such as infrared, Bluetooth, or WiFi.

It will be appreciated that the backup system 100 can include a plurality of communication interfaces 130, of the same or of different types, to accommodate multiple and/or different data sources 110. Depending on the type of communication interface 130, the communication interface 130 can include a communication port through which the connection 120 to the data source 110 is made. For instance, a USB communication interface 130 can include a USB communication port, and a FireWire communication interface 130 can include a FireWire communication port. Alternatively, the communication interface 130 can include a wireless antennae or an infrared transmitter/receiver unit for sending and receiving infrared signals.

The storage device 150 comprises a writable data storage medium and can be, for example, a HDD that has been partitioned into at least two logical storage areas. In this instance, each logical storage area is a partition of the HDD. Suitable HDDs for the storage device 150 include 1.0 inch, 1.8 inch, 2.5 inch, and 3.5 inch hard drives having capacities of 20 to 60 gigabytes (GB) or more. Other suitable storage devices 150 that include rewritable media are solid-state memory devices, such as SD memory cards and CF memory cards. The storage device 150 can also be an optical device such as a CD drive or a DVD drive where the writable data storage medium within such an optical storage device 150 can be either a write-once medium, such as a Compact Disc-Recordable (CD-R), DVD-Recordable (DVD-R or DVD+R), or a rewritable medium such as a Compact Disc-Rewritable (CD-RW), or DVD-Rewritable (DVD-RW or DVD+RW).

The storage device 150 can also be implemented by two different devices, one dedicated to each of the two logical storage areas 160, 170. For example, the first logical storage area 160 can be implemented by a CD drive with any CD media, while the second logical storage area 170 is implemented by a HDD. In a further example, the first logical storage area 160 can be implemented by a solid state memory while the second logical storage area 170 is implemented by an optical device with a writable data storage medium. In this further example, the two different devices could be contained within a common housing. It will be understood that the device types, form factors, and capacities provided herein are merely exemplary and not intended to be limiting.

In some embodiments, the backup system 100 further comprises a memory device interface 190 that allows the first and second logical storage areas 160 and 170 to communicate with the emulation component 140. In these embodiments the memory device interface 190 is of a type that is appropriate to the type of storage device 150. For instance, an Integrated Drive Electronics (IDE) interface 190 can be used with an IDE HDD storage device 150, and a Small Computer System Interface (SCSI) interface 190 can be used with a SCSI HDD storage device 150. Alternately, the memory device interface 190 can be a SD memory card host interface where the storage device 150 is a SD memory card. The interface 190 can also be a wireless interface such as infrared, WiFi, and Bluetooth. The memory device interface 190 can be implemented in the backup system 100 by an integrated circuit (IC) chip or through the use of discrete components. The memory device interface 190 is integrated into the memory device 150, in some embodiments. It will be appreciated that in the embodiments noted above that employ multiple storage devices 150, the backup system 100 can include multiple memory device interfaces 190 as appropriate.

The first logical storage area 160 represents a logical area of the memory device 150 that is meant to be inaccessible to the user and safe from accidental erasure. The first logical storage area 160 can contain, for example, a backup application, system files, drivers, and other setup and configuration software. The first logical storage area 160 is represented to the data source 110 by the emulation component 140 as being an auto-launch device. As used herein, auto-launch devices are those devices that will trigger the automatic execution functionalities of certain operating systems, such as the Auto-Run function of the Microsoft Windows operating system. Examples of device types that will trigger AutoRun of Windows include CD and DVD drives when a CD or DVD medium is contained therein. In these examples, the Windows AutoRun functionality is triggered either when the CD/DVD is placed in the CD/DVD drive already connected to the data source 110, or when the CD/DVD drive, already containing the CD/DVD medium, is connected to the data source 110.

The second logical storage area 170 represents a logical area of the memory device 150 that is dedicated to storing backed-up data. Accordingly, the emulation component 140 represents the second logical storage area 170 to the data source as being a device type that includes a writable data storage medium. The second logical storage area 170 can be represented as a HDD, CF, or a SD memory card, for example. In some embodiments, the second logical storage area 170 can be represented as the same type of device as the storage device 150. In other embodiments the second logical storage area 170 can be represented to be a different device type than the storage device 150.

The emulation component 140 provides certain functions to the backup system 100 and can be implemented through logic such as software, firmware, hardware, or any combination of these. It will be understood that within an embodiment different functions of the emulation component can be implemented with different forms of logic. Thus, while one function of the emulation component 140 is implemented through firmware, for example, another function can be implemented through software.

In one embodiment, the emulation component 140 includes an IC. For example, the emulation component 140 can be implemented using software, firmware, hardware, or some combination thereof, incorporated in a USB controller chipset. In some USB-specific embodiments, the emulation component 140 implements some or all of a number of layered industry standards. Examples of such standards include USB Specification—Revision 2.0, USB Mass Storage Class—Bulk Only Transport—Revision 1.0, SCSI Primary Commands-3 (SPC-3), SCSI Block Commands-2 (SBC-2), Multimedia Commands-4 (MMC-4), and AT Attachment with Packet Interface-6 (ATA/ATAPI-6). It should be noted that in some embodiments the emulation component 140 may only support subsets of the commands of these industry standards.

Functions provided by the emulation component 140 can include representing the first logical storage area 160 as an auto-launch device and representing the second logical storage area 170 as a device including a writable data storage medium. Accordingly, the data source 110 will recognize the data backup system 100 as two attached devices when connected to the backup system 100. It should be noted, however, that in some embodiments the contents of these two devices are not accessible to the user of the data source but are accessible by the backup application which is configured with appropriate application programming interface (API) calls. This serves to protect the contents of both the first and second logical storage areas from accidental modification or erasure. To access the backed up data from the second logical storage area 170 in some embodiments, the data backup system 100 restores the data to the data source or copies the data to yet another device. In other embodiments, the virtual device that represents the second logical storage area 170 is accessible to the user while the virtual device that represents the first logical storage area 160 is not accessible. In these embodiments, the user is allowed direct access to the contents of the second logical storage area 170 but not the first logical storage area 160.

Another function that can be provided by the emulation component 140 is translating commands and responses between formats, such as between the command sets for a HDD and a CD drive. In this way, when the data source 110 sends a command to the backup system 100 addressed to the auto-launch device (as the first logical storage area 160 is represented to be), the emulation component 140 translates the command from an auto-launch device format to the appropriate format for the storage device 150, before sending the command to the first logical storage area 160. Similarly, responses from the first logical storage area 160, in the format of the storage device 150, are translated into the auto-launch device format and sent to the data source 110 so the response appears to have come from an auto-launch device.

It should be noted that translation between CD drive and HDD formats is but one example, and in some embodiments the emulation component 140 can implement one or more analogous format translations. As used herein, a "storage device command" refers to a command in an appropriate format for the specific storage device, and a "storage device response" refers to a response in the same format. As a specific example, an "auto-launch device command" refers to a command in an appropriate format for a specific auto-launch device, and an "auto-launch device response" refers to a response in the same format.

Still another function that can be provided by the emulation component 140 is to pass commands and responses between the data source 110 and the second logical storage area 170. When the commands received by the emulation component 140 are already in the proper format for the storage device 150, the emulation component 140 does not have to translate commands or responses. Here, the emulation component 140 receives commands from the data source 110 addressed to the device that includes the writable data storage medium and passes the commands to the second logical storage area 170. In a similar fashion, responses are relayed back to the data source 110 without translation. It will be appreciated that the emulation component 140 can be configured to represent the second logical storage area 170 as being of a different type of device than the memory device 150. In these embodiments, the emulation component 140 is configured to translate between the formats of the memory device 150 and the device type of the representation of the second logical storage area 170.

Figure 2:
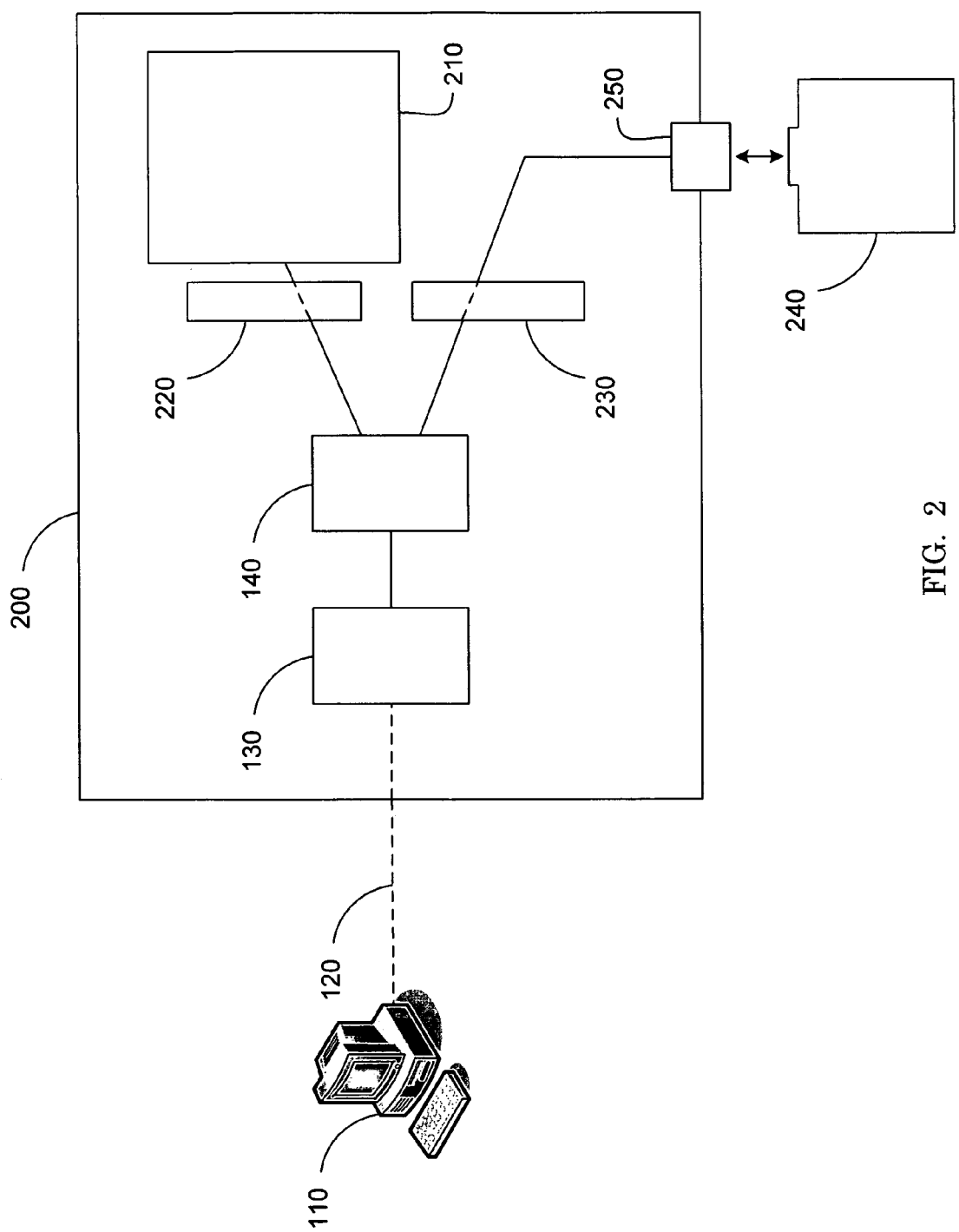
FIG. 2 is a schematic representation of a data backup system according to another exemplary embodiment of the present invention.

FIG. 2 provides a schematic representation of another exemplary embodiment of a data backup system 200 that, like the data backup system 100, is connected to the data source 110 by the connection 120. Also like the data backup system 100, the backup system 200 comprises the communication interface 130, and the emulation component 140. In this embodiment, the backup system 200 also comprises storage device 210 including a writable data storage medium and an appropriate memory device interface 220. Since the writable data storage medium of the storage device 210 only needs to include enough memory capacity to store a backup application and the like, the backup system 200 can be of a fairly small form factor, such as pocket-sized or a dongle, or be embedded in some other device configuration such as a dock or a cradle.

The data backup system 200 can also comprise a removable storage device interface 230 to allow a removable storage device 240, including a writable data storage medium, to be attached externally to the data backup system 200 by way of a communication port 250. The removable storage device interface 230 provides communication between the emulation component 140 and the removable storage device 240. In some embodiments the removable storage device interface 230 is configured to support a removable device with an integrated medium such as a flash memory device or a HDD. In other embodiments, the removable device can be one that accepts removable media, such as a CD drive.

It will be appreciated that the removable storage device interface 230 is optional as the copied files do not necessarily have to be stored to a memory device that is associated with the data backup system 200. Alternately, the backup application can direct copied files to be stored to an existing internal or external drive of the data source or to a networked drive. In still another option, the backup application can send copied files over an Internet connection to be stored at a web-based storage facility.

It should be noted that the backup systems 100, 200 can include a display or other visual indicator such as a light emitting diode (LED) to show files being copied, for instance, though some embodiments do not include the display to lower the cost and increase the durability of the backup systems 100, 200. The backup systems 100, 200 can run off of a battery, an external power source (e.g., an AC power outlet), or off of power supplied by the data source 110. In some embodiments, the connection 120 is a cable that is part of the backup system 100, 200. The backup systems 100, 200 can also be configured as a cradle designed to receive the removable storage device 240 or the data source 110 where the data source 110 is a consumer electronic device such as a digital camera.

Figure 3:
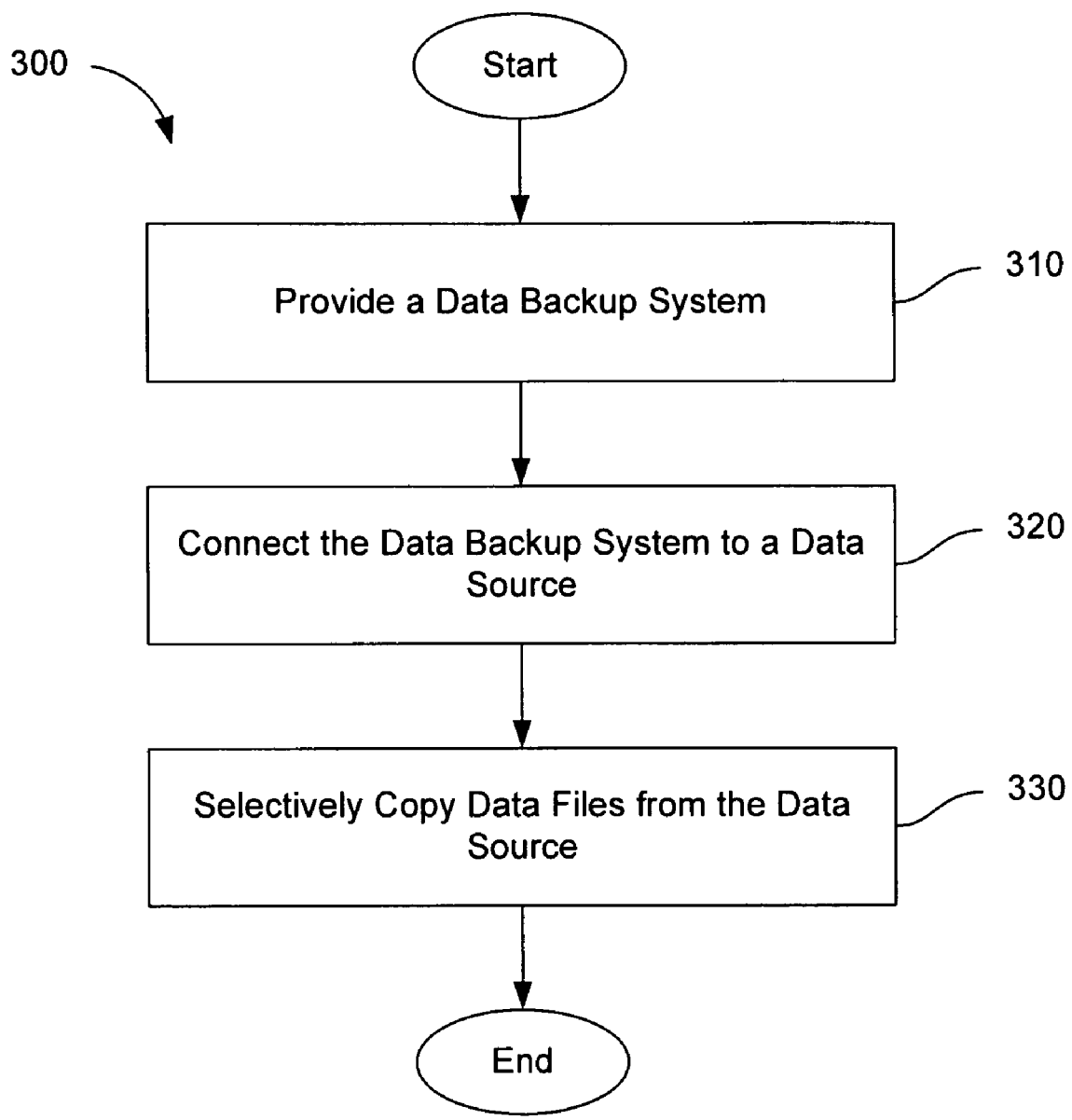
FIG. 3 is a flow-chart representation of a method for backing up data files on a data source according to an exemplary embodiment of the present invention.

FIG. 3 is a flow-chart representation of an exemplary method 300 for backing up data files from a data source. The method 300 comprises providing 310 a data backup system including a storage device storing a backup application, connecting 320 the data backup system to the data source to automatically launch the backup application, and selectively copying 330 the data files from the data source.

Providing 310 the data backup system can include providing data backup system 100 or data backup system 200, for example. In those embodiments in which the data backup system 200 is used, providing 310 the data backup system 200 can include, for example, connecting a removable storage device 240 to the communication port 250. Where the removable storage device 240 is, for example, a SD or CF memory card, connecting the removable storage device 240 to the communication port 250 can include inserting the memory card into the communication port 250. Alternately, where the removable storage device 240 is a HDD, connecting the removable storage device 240 to the communication port 250 can include coupling the communication port 250 to the removable storage device 240 with a connection such as a cable or a wireless link.

With reference to data backup systems 100, 200, connecting 320 the data backup system 100, 200 to the data source 110 can include coupling the communication interface 130 to the data source 110 with the connection 120. Connecting 320 the data backup system to the data source also includes the data source recognizing the data backup system as two new devices. For example, some operating systems periodically query unused ports for newly attached hardware. An exemplary process by which the data backup system 100, 200 can be recognized by the data source 110 as being two attached devices is described below with respect to FIG. 4.

Connecting 320 the data backup system to the data source automatically launches a backup application. Operating systems that include an automatic execution function, such as the AutoRun capability of the Windows operating system, can execute applications that are resident on an auto-launch device. Here, the automatic execution function of the data source's operating system recognizes the backup application as an application to be launched, and automatically launches the backup application to run on the data source.

Connecting 320 the data backup system to the data source can also comprise translating commands and responses between device formats as communications are passed between the data source and the data backup system, as discussed above with respect to the functionality of the emulation component 140. Thus, for example, CD read commands sent to the backup system 100 are translated to HDD read commands before being sent to the first logical storage area 160.

Selectively copying 330 the data files from the data source can include running the backup application on the data source, where the backup application is configured to search one or more storage devices associated with the data source. The backup application can, in some embodiments, search directories of internal storage devices, external storage devices, and network drives that are accessible to the data source. The backup application selectively copies files to a storage device including a writable data storage medium such as the second logical storage area 170 or the removable storage device 240.

The backup application selects files that meet at least one criterion, such as file type (e.g., .jpg) or type of content (e.g., audio files). The backup application can also find files that meet at least one of several criteria. Other examples of types of content include e-mails, business application data (e.g., Accpac and Simply Accounting files), digital video files, ebook files, contacts files, calendar files, text files, tasks files, settings files, bookmark files, and password files. Another criterion, in some embodiments, is whether a file has been previously backed up. Yet another criterion can be a particular date or a range of dates. The backup application, in some embodiments, finds files that meet the criteria by searching e-mail attachments and files embedded within other files, such as compressed files within a zip file. The backup application can find files that are stored directly on the data source, or additionally on associated peripheral devices and networks.

The backup application can, in some embodiments, create a file path or directory structure on the writable data storage medium of the data backup system to indicate the location where a copied file was located on the data source. In other embodiments, the backup application creates a new directory structure based on chronological order, alphabetical order, file size, or some other criteria. Another alternative is for the backup application to create a monolithic file that includes all of the backed up files. Yet another alternative is for the backup application to store on the writable data storage medium the backed up files in a common directory (i.e., a flat structure) and to create an index (e.g. an XML index) that stores the information on file locations. In these embodiments, when the backed up files are restored the index is used to re-create the directory structure on the data source.

It will be appreciated that according to the method 300, user involvement can be reduced to simply making a physical connection between a data backup system and a data source. While user involvement can be reduced to one or more simple operations, it will be appreciated that options can be provided to the user through a graphical user interface (GUI) provided by the backup application on a display device of the data source. In this way the user, if desired, can customize the backup process by specifying search criteria such as a type of content or a file type to be copied. Additionally, the user can limit the scope of the backup process by drive, directory, folder, file type, file size, or date/time stamp, or the user can deselect a type of content or a specific file, drive, directory, or folder such as a temporary folder or an Internet Explorer directory.

As noted, selectively copying 330 the data files from the data source can include running the backup application on the data source. In addition to the above functions of the backup application, the backup application can also be configured to perform the following functions as part of selectively copying 330 the data files. For example, the backup application can wait a predetermined length of time and then repeat the backup process so long as the backup system remains connected to the data source 110. The backup application can also perform a self-diagnostic routine at predetermined intervals. The backup application can also be configured to wait for a predetermined period of time before performing an automatic backup to provide the user an opportunity to customize the backup process. Additionally, the backup application can be configured to selectively copy 330 the data files only upon a user command, rather than automatically. The user command can be entered through the GUI on the data source, or can be provided by a button or switch on the data backup system. Alternately, the backup application can be configured to selectively copy 330 the data files whenever a removable storage device 240 is connected to the communication port 250.

Copying 330 the data files, in some embodiments, includes determining whether the data source has been previously paired with the data backup system (e.g., the data source was previously backed up with the data backup system). This can include, for example, searching for a marker that was previously left on the data source, or comparing a marker saved on the data backup system with an identifier of the data source such as a volume label. The marker allows the backup application to recognize the data source. In some embodiments, the backup application determines a course of action based on whether the data source has been previously paired with the data backup system and if so, whether the data backup system already stores data associated with the data source. For instance, the course of action can be an automatic backup of the data source, either full or incremental, a restoration of backed up data to the data source, or a query to the user to make a selection between these or other alternatives.

Figure 4:
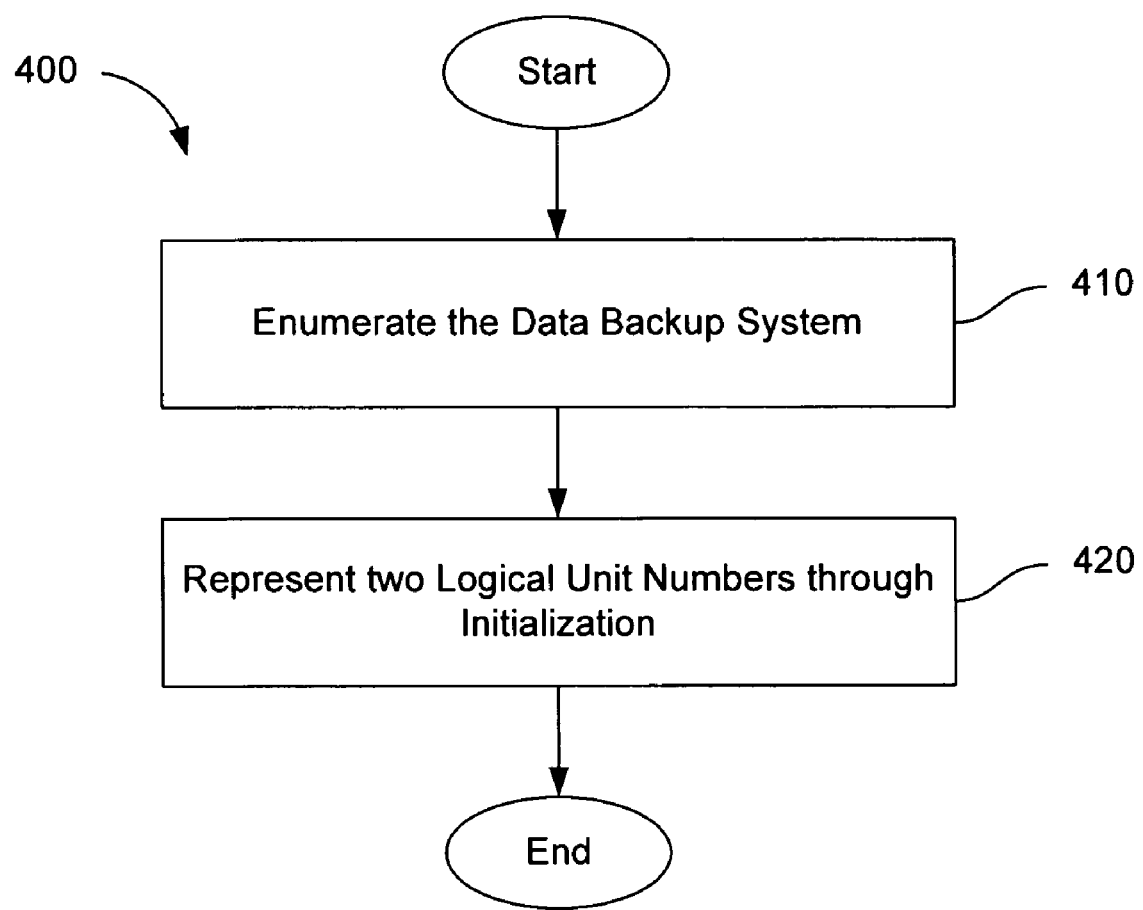
FIG. 4 is a flow-chart representation of a process by which a data backup system can be recognized by the data source as being two attached devices according to an exemplary embodiment of the present invention.

FIG. 4 is a flow-chart representation of an exemplary method 400 by which the data backup system, once detected, becomes recognized as two attached devices by the data source. Although this exemplary method 400 is described with reference to USB protocols, it will be understood that other protocols such as FireWire follow analogous processes. The method 400 comprises the data source enumerating 410 the data backup system, followed by the emulation component of the data backup system representing 420 two Logical Unit Numbers (LUNs) through initialization.

Enumerating 410 the data backup system is performed to identify the newly attached hardware, in this case the data backup system, and how the hardware is configured for communication. Enumerating 410 comprises the data source assigning a unique device number and querying the data backup system for a device descriptor. The emulation component responds by providing a device descriptor to the data source. Enumerating 410 further comprises the data source setting an address for the data backup system. Once the address has been set, the data backup system obtains communication frames assigned to the address. Enumerating 410 can also comprise the data source requesting and receiving detailed device information from the data backup system, specifically the emulation component, such as class, subclass, and protocol.

Enumerating 410 also comprises the data source starting an appropriate USB mass storage class driver, and the USB mass storage class driver requesting the number of LUNs from the data backup system with a "GET MAX LOGICAL UNIT NUMBER" command. Enumerating 410 also comprises the data backup system, and more specifically the emulation component, responding to the "GET MAX LOGICAL UNIT NUMBER" command by communicating two LUNs to the data source.

Representing 420 the two LUNs through initialization comprises the emulation component receiving a number of SCSI commands directed to each LUN from the data source. The emulation component handles each LUN independently. The emulation component responds to those SCSI commands that it recognizes, and generates a standard error condition in response to SCSI commands that are not recognized. Each SCSI command, and any errors that are generated, are typically handled before the next SCSI command is issued to either LUN. It will be understood that the sequence of SCSI commands sent to the LUN representing a storage device including a writable data storage medium can be different from those sent to the LUN representing an auto-launch device. Additionally, SCSI commands, or a sequence of SCSI commands, may be repeated multiple times by the data source, and sequences of SCSI commands directed to the two LUNs can be interlaced.

For both LUNs, the sequence of SCSI commands starts with the USB mass storage class driver issuing an "INQUIRY" command to identify the device type. The emulation component returns a response to represent a storage device, such as second logical storage area 170 (FIG. 1), as a storage device that can include a writable data storage medium. A response of "0x00," for example, indicates that the storage device is a HDD. Similarly, the emulation component returns a response to represent a storage device, such as first logical storage area 160 (FIG. 1) as an auto-launch device. A response of "0x05," for instance, indicates that the auto-launch device is a CD drive. The storage device that can include a writable data storage medium can additionally be marked as either "removable" or "non-removable," while the auto-launch device can be marked as "removable." After this point, the sequence of SCSI commands for the two LUNs diverge. It will be appreciated that the order of SCSI commands in the sequences described below are exemplary, and the order of the SCSI commands will vary with different data sources. Also, in some instances one or more of the SCSI commands provided below are omitted, and/or other SCSI commands are included.

An exemplary sequence of SCSI commands directed to the storage device that includes the writable data storage medium continues with a "READ FORMAT CAPACITIES" request that the data source uses to determine whether the writable data storage medium is unformatted. Ordinarily, the medium of the storage device being represented is already formatted, and the emulation component responds accordingly. Otherwise, the data source will attempt to format the medium of the storage device. Next, the data source issues a "READ CAPACITY" request to identify the capacity of the writable data storage medium and its block size, and the emulation component returns this information as well. A "READ(10)" command is issued to read the first block on the writable data storage medium. The first block has a logical block addressing (LBA) value of zero (LBA=0) and contains the Master Boot Record (MBR), which itself contains the partition table for the writable data storage medium. The emulation component responds with the contents of the requested block.

A "MODE SENSE(6)" command is then used to extract the capabilities of the storage device including the writable data storage medium, such as whether the storage device contains a disk cache. The emulation component replies as appropriate to the capabilities of the storage device being represented. Another "READ(10)" command is issued to recover the first block of the file system that contains the root directory. The first block of the file system can be located at LBA=0x3F, for example, but can vary depending on the particular type of file system being represented. The emulation component returns the first block of the file system. Finally, the data source can issue a "TEST UNIT READY" request before reading the full contents of the root directory, etc. Here, the emulation component responds affirmatively so that the data source will regard the storage device that includes the writable data storage medium as operational. The data source thereafter issues more read/write requests as necessary.

An exemplary sequence of SCSI commands directed to the auto-launch device continues with a "GET CONFIGURATION" request to obtain information about the capabilities of the auto-launch device and its ability to read or write different types of optical media, e.g., CD-R, CD-RW, DVD-R, DVD+R, DVD-RW, DVD+RW, etc. The emulation component responds with capabilities that are appropriate for the auto-launch device being represented to the data source. This can be followed by a "READ CAPACITY" request to discover if there is a medium present in the auto-launch device. The emulation component is configured to respond by failing the initial attempt. In response, the data source will issue a "REQUEST SENSE" command to access the extended error information. In the reply, the emulation component sets the "Sense Key" to "UNIT ATTENTION," and sets the "Additional Sense Code" to "POWER ON." The data source will then repeat the "READ CAPACITY" request, and the emulation component will respond with a capacity, such as the size of the first logical storage area 160 (FIG. 1).

To learn what types of status change events the read-only media device supports, the data source issues an initial "GET EVENT STATUS NOTIFICATION" request, and the emulation component responds with a set of coded status fields. The data source can then repeat the "GET EVENT STATUS NOTIFICATION" request, with a field set to a status entry to be checked. If the operational status field is enabled, for example, the emulation component will respond with an operational change event, and a status code representing a feature change. This response can trigger the data source to issue further "GET CONFIGURATION" request(s), to discover which feature, if any, has changed.

The data source can also issue a "MODE SENSE(10)" request for Page Code (0x2A), known as the "MM Capabilities and Mechanical Status Page." The emulation component will respond with information that is typical for a simple auto-launch device that includes read-only support for CD-R and CD-RW media. This echoes the information that is returned in response to the "GET CONFIGURATION" request.

At this point, the data source can issue a "TEST UNIT READY" command. This triggers two sequences of request/response events in the emulation component that can support the automatic execution functionality of different operating systems. The commands in the two sequences can be interlaced, and the events will remain pending until the emulation component has passed through all of the expected states. As outlined below, both sequences are typical for an operating system such as Windows XP. The sequences, below, do not account for the number of times that a request, or a sequence of requests, can be repeated. Also, the particular sequence of events can vary depending on the type and version of the operating system executing on the data source. Additional or substitute commands can also be issued.

The first sequence comprises a series of "TEST UNIT READY" commands from the data source to the auto-launch device. The emulation component is configured to fail the first request. The data source then sends a "REQUEST SENSE" command to obtain the extended error information, and the emulation component sets the sense key to "NOT READY," with an additional sense code of "MEDIUM NOT PRESENT." The data source then repeats the "TEST UNIT READY" command, which the emulation component again fails. The data source again sends a "REQUEST SENSE" command and the emulation component responds with a sense key set to "UNIT ATTENTION," and an additional sense code of "MEDIUM MAY HAVE CHANGED." All subsequent "TEST UNIT READY" commands are typically responded to without error.

The second sequence comprises a series of "GET EVENT STATUS NOTIFICATION" requests from the data source to the auto-launch device. Following the first "TEST UNIT READY" command that triggers the first sequence, the data source issues a "GET EVENT STATUS NOTIFICATION" request with the operational change field enabled. The emulation component responds with an operational change event and a status code representing a feature change. On the following "GET EVENT STATUS NOTIFICATION" request the media status field is enabled. The emulation component responds with a media event, a status code representing new media, and a flag set to indicate that the media is present. On all subsequent "GET EVENT STATUS NOTIFICATION" requests where the media status field is enabled, the emulation component responds with a media event and with the media present flag set, but the status code will not indicate new media. In the case where a "GET EVENT STATUS. NOTIFICATION" request is issued, and the expected status field is not enabled, the emulation component responds as appropriate for the current state of that event.

At the end of either or both of these sequences, the data source can send a "READ TOC/PMA/ATIP" request to read the Table Of Contents (TOC) from the medium of the auto-launch device. The TOC includes information on the number of tracks on the medium, and the start position of each. The emulation component responds with entries for a default configuration, namely, a single data track that starts immediately after the "lead-in" area. The default TOC declares that the first block of data on the medium starts at address zero. The position of a last track is fixed in the emulation component and represents the space allocated to the data on the auto-launch device, such as the backup application.

When the data source makes a read request of the auto-launch device, the emulation component automatically translates the logical address into a corresponding physical address of the storage device (e.g., first logical storage area 160 (FIG. 1)) that is being represented as the auto-launch device. In addition, where the block sizes of the storage device (e.g., a HDD partition) that is being represented as the auto-launch device (e.g., a CD drive) are different, the emulation component also translates the required amount of auto-launch device data into the appropriate number of blocks on the storage device.

After the method 400 has been completed, the data source recognizes one LUN as an auto-launch device and another LUN as a storage device including a writable data storage medium and is properly configured to communicate independently with each. Thereafter, selectively copying 330 the data files from the data source can commence. As described above, this can include the operating system of the data source automatically launching a backup application from the LUN being represented as the auto-launch device, and writing selected data from the data source to the LUN being represented as the storage device including a writable data storage medium.

As provided above with respect to FIG. 1, the first logical storage area 160 of the backup system 100 can comprise, in addition to or in lieu of the backup application, various system files, drivers, and other setup and configuration software. One such additional application that can be included in the first logical storage area 160 is a health check application. Like the backup application, the health check application can be launched automatically upon connection of the backup system 100 to the data source 110.

The health check application, in various embodiments, runs diagnostics on the backup system 100, the data source 110, or both. These diagnostics can evaluate software, firmware, and/or hardware, in some embodiments. In addition to running diagnostics, the health check application can also perform other functions such as installing updates and running maintenance and repair utilities, tools, and services. The health check application can alternatively be implemented in either a software layer, a firmware layer, the basic input/output system (BIOS), or a combination thereof.

With respect to the backup system 100, the health check application is desirable to provide increased data integrity. Specifically, the health check application can warn a user of an impending problem in time to copy the data files stored on the backup system 100 to other storage. The health check application can also, in some embodiments, repair certain problems with the backup system 100 in order to extend the useful lifetime of the backup system 100. It will be appreciated that the data source 110 can similarly benefit from the automatic features of the health check application. While the embodiments described herein pertain particularly to HDDs, the useful lifetimes of other storage devices, and the data integrity of data stored thereon, can likewise be extended through the use of analogous diagnostic, maintenance, and repair utilities.

Figure 5:
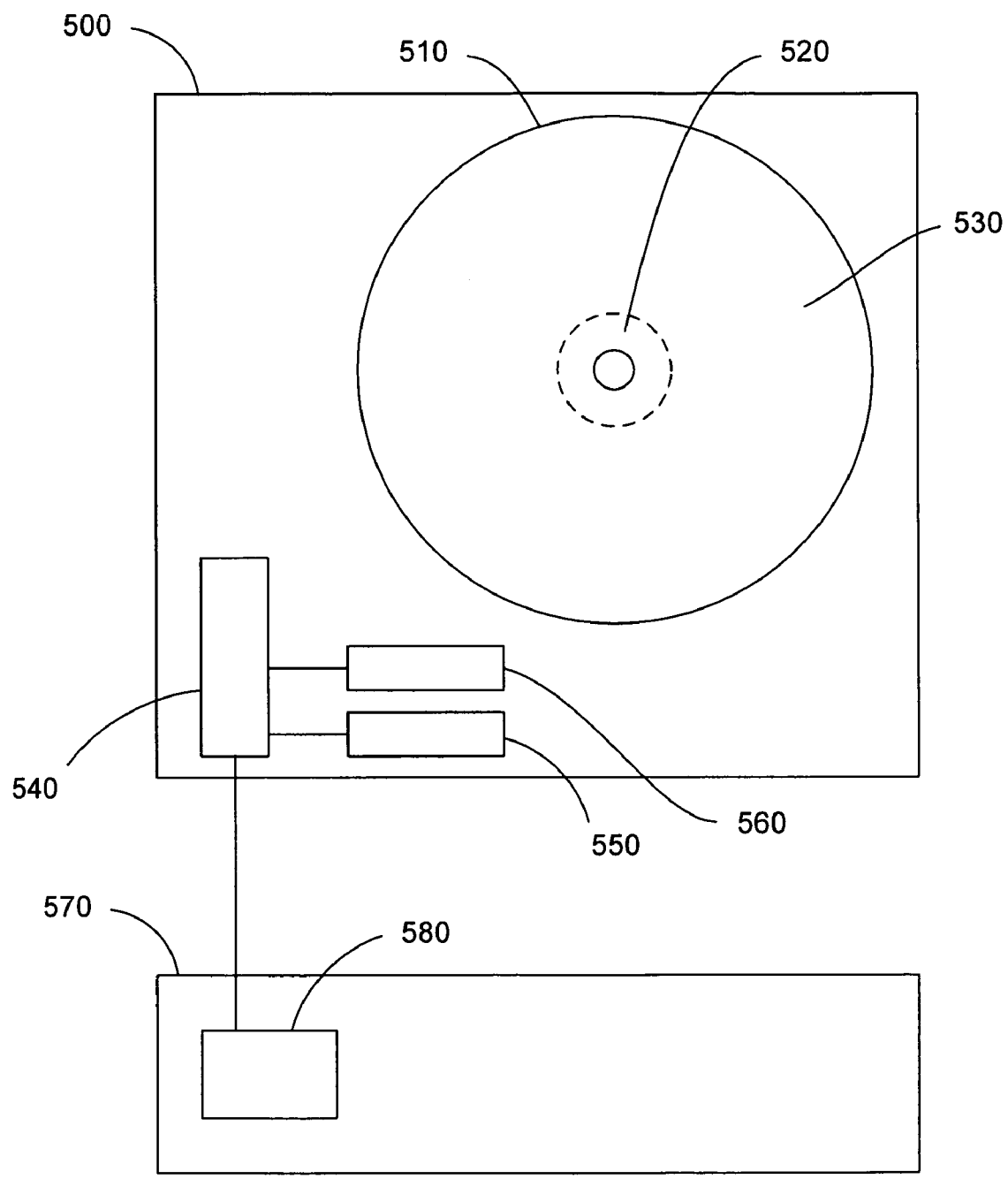
FIG. 5 is a schematic representation of a hard disk drive and printed circuit board according to an exemplary embodiment of the present invention.

FIG. 5 shows a schematic representation of an exemplary HDD storage device 500 comprising a hard disk 510 as a writable data storage medium. The HDD storage device 500 can be employed in a backup system such as backup system 100 (FIG. 1) as the storage device 150 (FIG. 1) or another system including an emulation component such as emulation component 140 (FIG. 1). As described above with respect to FIG. 1, the hard disk 510 can be partitioned into a first logical storage area 520 and second logical storage area 530 where the first logical storage area 520 is intended for storing applications such as a backup application and/or a health check application, system files, drivers, and so forth. The HDD storage device 500 also comprises a central processing unit (CPU) 540 that, amongst other things, is configured to monitor certain operational parameters of the HDD storage device 500. The CPU 540 can also be configured to receive data from various sensors such as a temperature sensor 550 and an impact sensor 560.

FIG. 5 also shows a schematic representation of an exemplary printed circuit board (PCB) 570 including a controller chip 580 in communication with the HDD storage device 500. The controller chip 580 can include firmware configured to read operational parameters from the CPU 540. In a system such as backup system 100 (FIG. 1), the PCB 570 can additionally comprise interfaces such as communication interface 130 (FIG. 1) and memory device interface 190 (FIG. 1). In some embodiments, the controller chip 580 implements the emulation component 140 (FIG. 1), while in other embodiments the emulation component 140 is implemented by a separate component on the PCB 570. It will be appreciated that in some embodiments the health check application resides in the controller chip 580 or other hardware or firmware components on the PCB 570.

In some embodiments, the health check application comprises a number of sub-components, and in further embodiments the sub-components are distributed across different components. For example, sub-components of the health check application can reside on the data source 110 (FIG. 1), the controller chip 580, and the first logical storage area 520 of the hard disk 510. As noted previously, the health check application can be implemented in either a software layer, a firmware layer, the BIOS, or a combination thereof. Thus, sub-components including a log database (described below), a GUI, and diagnostic, maintenance, and repair utilities can reside on the data source 110, while other sub-components reside in firmware of the PCB 570.

The methods described below with respect to FIGS. 6-10 can utilize various utilities. These utilities can be implemented through software, firmware, hardware, or combinations thereof. Various utilities reside on the data source 110 (FIG. 1) or the backup system 100 (FIG. 1), and more specifically as executable code stored in the first logical storage area 520 or in the CPU 540 or the controller chip 580. Alternatively, the methods can utilize various utilities made available across a network to which the data source 110 is connected. Exemplary networks include the Internet, intranets, and local area networks (LANs). In some embodiments of the methods, two or more utilities can be run in parallel. Before describing the methods referred to by FIGS. 6-10, a number of utilities are first described.

An example of a utility that can be used by the health check application is a sector swap utility. This utility can automatically hide bad sectors of a hard disk 510 and relocate any data stored therein to other sectors. In some examples of this utility, a number of reserve sectors are maintained in a reserve zone to replace bad sectors. A map of relocated sectors can be stored in the firmware of the HDD storage device 500 and loaded to a controller Read-Only Memory (ROM) when the HDD storage device 500 is powered up. Other utilities that can be used by the health check application include the Windows disk utilities such as Disk Cleanup and Disk Defragmenter.

Still another example of a utility that can be used by the health check application is a Self-Monitoring, Analysis and Reporting Technology (SMART) utility. The SMART utility takes advantage of the understanding that most HDD faults occur from a progressive degradation of mechanical and electrical components. Accordingly, the SMART utility monitors certain operational parameters that are known to correlate to failures. Should such a parameter drift outside of an acceptable range or exceed a threshold, suggesting a likelihood of a pending catastrophic failure, the SMART utility can trigger other utilities and/or provide an informational message to the user to immediately safeguard the data before the catastrophic failure occurs. Other actions that can ensue include changing the user display, disallowing further data files to be backed up to the backup device 100, and/or shutting down the backup device 100.

Still other utilities monitor certain environmental conditions of the HDD storage device 500, such as acceleration and temperature. The impact sensor 560 in the HDD storage device 500 can respond to a sudden change in acceleration, in some examples, by rapidly parking the magnetic heads before damage to the hard disk 510 can occur. A typical impact sensor 560 comprises a piezoelectric sensor that produces an electrical voltage spike when subjected to a mechanical shock. Filtering of the output of the impact sensor 560 can help limit the response to only those impacts that would likely cause damage to the hard disk 510. Similarly, the temperature sensor 550 can be employed to shut down the HDD storage device 500 if the temperature within the HDD storage device 500 becomes too hot or too cold or changes too abruptly.

Figure 6:
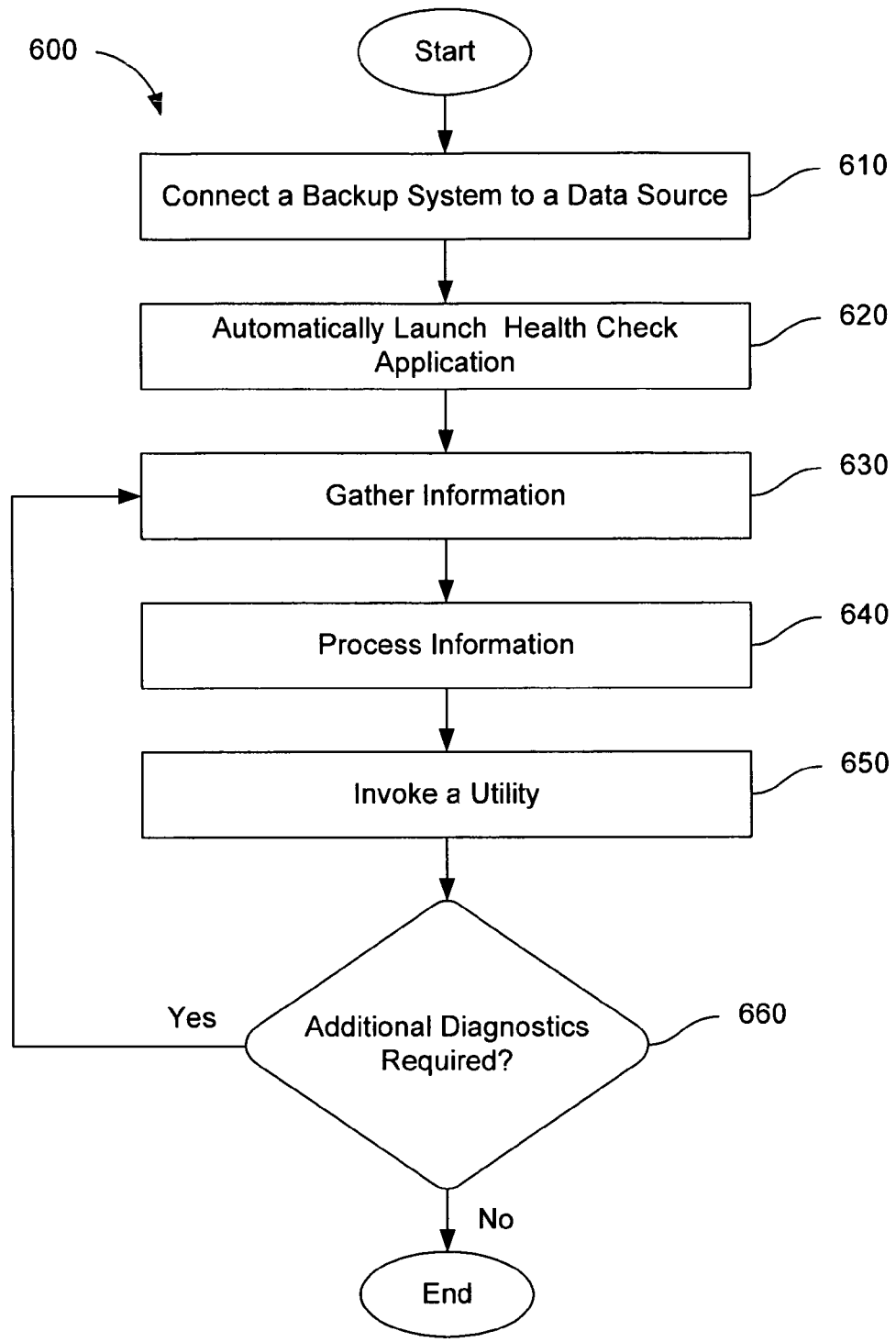
FIG. 6 is a flow-chart representation of a method for diagnosing a system and implementing an appropriate response according to an exemplary embodiment of the present invention.

Turning to examples of methods, FIG. 6 shows a flow-chart representation of an exemplary method 600 for diagnosing a backup system and implementing an appropriate response thereto. It will be appreciated that although the method 600 is described with reference to a backup system, the method is equally applicable to any system that can emulate an auto-launch device. The method 600 comprises connecting 610 a backup system to a data source, automatically launching 620 a health check application, gathering 630 information, processing 640 the information, invoking 650 a utility, and determining 660 whether additional diagnostics are required. If further diagnostics are required, the method 600 returns to gathering 630 information.

Connecting 610 the backup system to the data source has been previously described with respect to connecting 320 the data backup system to the data source (FIG. 3). Connecting 610 the backup system to the data source automatically launches 620 the health check application by taking advantage of an automatic execution function of the operating system of the data source, as described herein with respect to automatically launching a backup application. Alternatively, the health check application can be launched at other times, such as in response to a triggering event like the detection of a fault during a backup, a user request, an elapsed length of time, exceeding a threshold capacity of a storage device of the backup system, and so forth. With reference to FIG. 5, executable code for the health check application can reside on the first logical storage area 520. When launched, the health check application runs on the data source 110 (FIG. 1) and communicates with the controller chip 580. The health check application can run before or after the backup application performs a backup, or can run concurrently with the backup application, in some embodiments.

Figure 7:
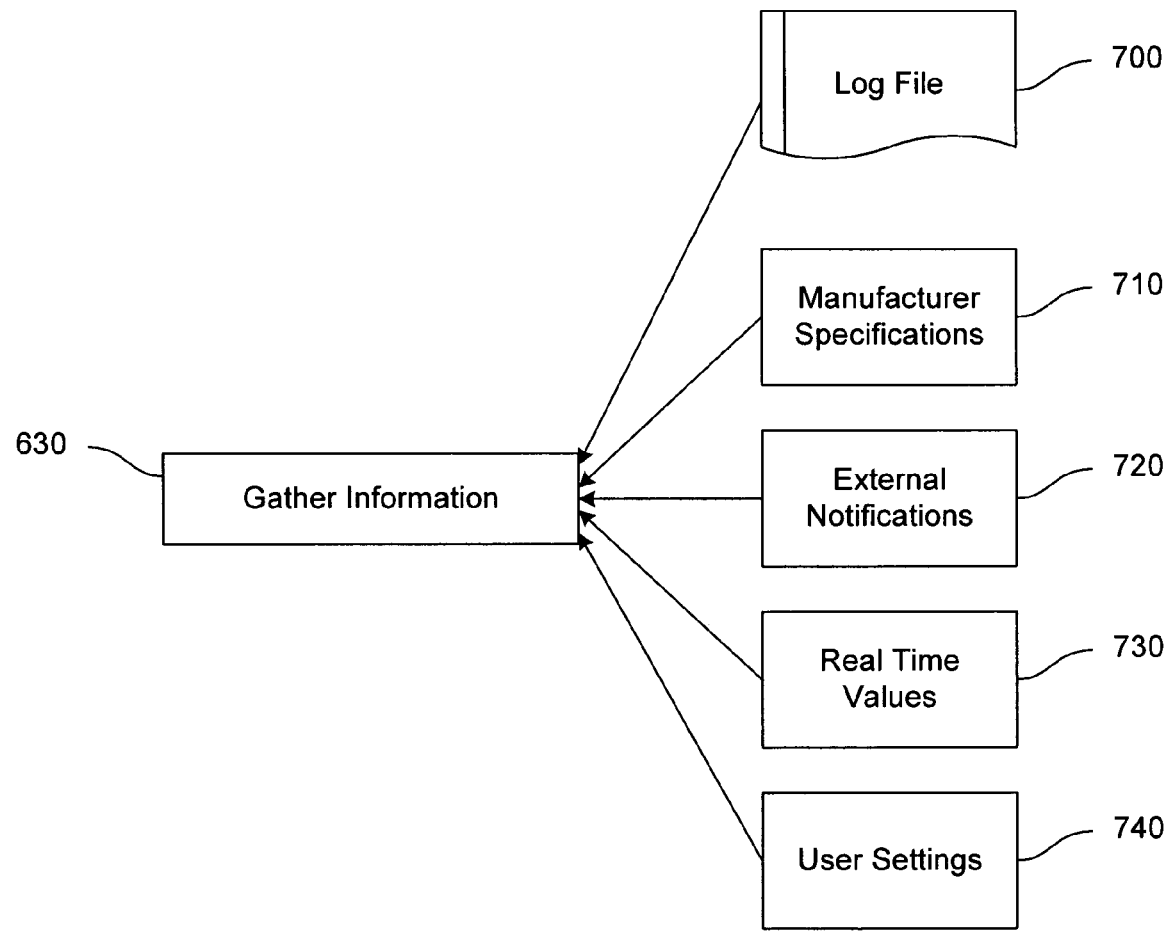
FIG. 7 provides a graphical representation of exemplary sources of information that can be called upon in the method of FIG. 6.

Gathering 630 information provides the health check application running on the data source with diagnostic information from one or more sources, as shown in FIG. 7. One exemplary source of information is one or more log files 700 of historical information that can be maintained within a log database that is stored, for example, on the data source. Log files 700 and log databases are discussed further below. Another exemplary source of information that can be gathered 630 by the health check application are manufacturer specifications 710. Manufacturer specifications 710 can include ranges and thresholds established by the manufacturer of the HDD 500 (FIG. 5) such as the normal operating temperature range.

External notifications 720, real-time values 730 (e.g., the temperature as measured by the temperature sensor 550), and user settings 740 represent further sources of information that can be gathered 630 by the health check application. User settings 740 refer to parameters that can be altered by a user, for instance, through a GUI provided by the health check application on a display device of the data source. Such parameters can include the types of health checks to be applied to the backup system, the frequency with which the checks are performed, and the depth of the checks. In some embodiments the health check application includes default values for these parameters. In one embodiment, the parameters are grouped together to comprise user settings 740 (FIG. 7) of "low," "medium," and "high," with "medium" as the default setting. By selecting between the user settings 740, the user may make a trade-off between security and time efficiency, with a setting of "high" offering the greatest security at the expense of being the most time consuming, with a setting of "low" offering the fastest backup at the expense of reduced security.

Processing 640 the gathered information comprises the health check application applying diagnostic rules such as comparing real-time values 730 against manufacturer specifications 710. By processing 640 the gathered information, a problem with the backup system may be determined. As noted above, a problem can be any of a broad range of issues, with examples including an operating temperature within the backup system that is too high, the existence of a bad sector, out-of-date software or firmware, an indication of an impending catastrophic failure, and so forth. Even in the absence of a problem, the application of the diagnostic rules may determine that a maintenance utility should be employed.

Processing 640 the gathered information can comprise a complete self-diagnostic health check of the components of the backup system including the PCB 570, the controller chip 580, the hard disk 510 for problems that could lead to hardware or firmware failures. Processing 640 the gathered information also can examine any data stored on the hard disk 510 for evidence of corruption.

In some instances, in response to identifying a problem, the health check application presents the user with a notification concerning the nature of the problem and suggested solutions. Based on the user's input, the health check application can invoke 650 a utility to address the problem. In other instances, the health check application invokes 650 a utility automatically. Where the identified problem is out-of-date software or firmware, the health check application can obtain and install an update for the software or firmware. Similarly, in the absence of a problem, the health check application can either suggest a maintenance utility or invoke 650 such a utility automatically. Where no problem is found and no need for maintenance or other action is determined by processing 640 the gathered information, invoking 650 a utility is skipped.

Next, the health check application determines 660 whether additional diagnostics are required. If further diagnostics are required, the method 600 returns to gathering 630 information, otherwise the method 600 ends. Additional diagnostics can be required, for example, after a repair or maintenance utility has been invoked 650 in order to determine whether the utility was effective. If not, or if only partially effective, the same utility can be invoked 650 again, or another utility can be invoked 650. In some embodiments, further diagnostics are required based on elapsed time since the last iteration of the method 600. In these embodiments, the method 600 does not end, but idles at determining 660 whether additional diagnostics are required until a sufficient period of time has elapsed. The method 600 can also idle while waiting for another trigger such as the beginning or the end of a data backup, a request from the user to initiate a health check, or a threshold capacity of the hard disk 510 has been exceeded, such as 80% of capacity.

As noted, the health check application can create and maintain a log file 700 of historical information. The historical information can pertain to both hardware and software related parameters and can be automatically collected from a variety of sources. Examples of such sources include the backup application, firmware and software updates, data integrity checks, hard disk scan and repair utilities, and the SMART utility. User warnings, and user actions taken in response, can also be recorded in the log file 700.

Preferably, each time a monitored value changes, the new value is recorded in the log file 700. Stored values can comprise, for example, information about the backup system usage, including the last time the backup application was run, the amount of data stored on the backup system, the frequency with which the backup application has been run, and details pertaining to the previous backup session (full or incremental, successful or not, etc.). Other stored values can include values determined by the SMART utility, results of previous health checks, previous warnings, previous repair history including corrective actions taken by the user, the degree of fragmentation of the hard disk, the total number of backed up files and their average file size, and user settings 740. Still further values comprise the histories of firmware and software updates, a list of utilities available to be invoked 650 by the health check application, and the presence of an internet connection for downloading or updating firmware, the health check application, or the utilities that can be invoked 650.

Figure 8:
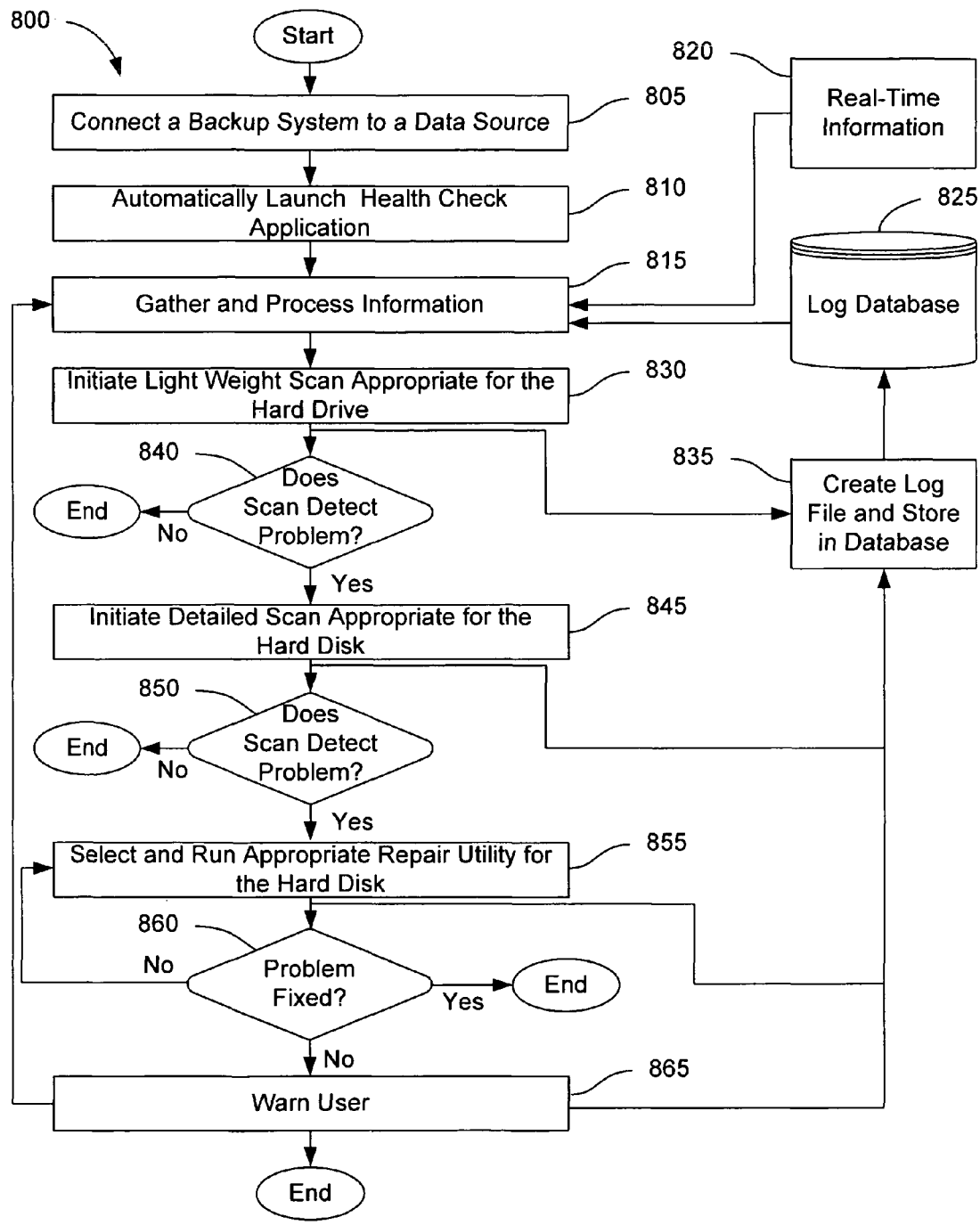
FIG. 8 is a flow-chart representation of a method for diagnosing a system and implementing an appropriate response according to another exemplary embodiment of the present invention.

FIG. 8 shows a flow-chart representation of another exemplary method 800 for diagnosing a backup system and implementing an appropriate response thereto. As with method 600, while the method 800 is described with reference to a backup system, the method is equally applicable to any system that can emulate an auto-launch device. Similar to method 600, the method 800 comprises connecting 805 a backup system to a data source, automatically launching 810 a health check application, and gathering and processing 815 information. In this particular embodiment, the information comes from two sources, real-time information 820 and a log database 825. The real-time information 820 can comprise, for example, information from the SMART utility.

The log database 825 provides log files 700 (FIG. 7) of historical information. The log database 825 can be a relational database or file-based in various implementations. The log database 825, in some embodiments, comprises a plurality of sub-components, and in further embodiments the sub-components reside in different locations such as some on the data source 110 (FIG. 1) and others on the backup system 100 (FIG. 1). As one example, the log database 825 can comprise a file-based log on the hard disk 510 configured to provide information to a relational database log residing on the data source 110.

Based on the gathered and processed 815 information, the health check application next initiates 830 a light weight scan that is appropriate for the hard disk of the backup system to test the fitness and integrity of the hard disk as well as any data stored thereon. The light weight scan checks the hard disk for any apparent issues that could cause the hard disk to fail, and for possible corrupted stored data. The selection of the particular utility to perform the light weight scan will depend on the particular rules implemented by the health check application and the particular utilities that are available to the health check application. The results of the light weight scan are collected in a log file 835 and stored in the log database 825.

If the light weight scan detects 840 a problem, then the health check application initiates 845 a detailed scan that is appropriate for the hard disk, otherwise, the method 800 terminates at this point. Another log file 835 is created with the detailed scan results and also stored in the log database 825 and, if a problem is still detected 850, a repair utility that is appropriate for the hard disk and the type of detected problem is selected and run 855, resulting in another log file 835. Otherwise, the method 800 terminates at this point.

If the problem is still detected 860, either another utility can be selected and run 855, or the user can be warned 865 with an appropriate warning displayed on a display device of the data source. The warning on the display device can indicate a level of severity of the problem. If the problem is not detected 860, the method 800 can terminate. Warning 865 the user can also comprise, in some embodiments, creating an audible alarm from either of the data source or backup system. Additionally, warning 865 the user can comprise sending an e-mail alert or a network message. Successive warnings to the user can become more drastic. In some instances, warning 865 the user can comprise preventing a backup from starting, halting a backup in progress, or powering down the backup system.

Optionally, if the problem is still detected 860, the health check application can also return to gathering and processing 815 information to try again. In either event, another log file 835 is created and stored to the log database 825. If the selected utility is able to repair the problem, and no problem is detected 860, a log file 835 is again created, with the details pertaining to the utility and the repair, and stored to the log database 825 and the method 800 can terminate. Although not shown in FIG. 8, in some embodiments, if the repair is successful, rather than terminating, the method 800 returns to gathering and processing 815 information to verify that no further problems exist.

It will be understood that if either of the light weight or detailed scans do not result in a problem being detected 840, 850, although the method 800 can terminate, in the alternative the health check application can instead run one or more maintenance utilities such as Disk Cleanup and Disk Defragmenter before ending. Again, with each utility that is run, a log file 835 can be created and stored to the log database 825.

The decision to run a maintenance utility can be based on various factors such as the length of time since the last maintenance utility was run.

Additionally, it will be understood that initiating 830 the light weight scan is optional in some embodiments. For example, the health check application can be configured to bypass the light weight scan in favor of the detailed scan if no log file 825 exists, as would be the case, for instance, the first time the health check application is executed. In another example, if the user setting is "high" for the degree of security, the light weight scan will be bypassed in favor of the detailed scan, in some embodiments. Similarly, the health check application can opt to bypass both the light weight and detailed scans if there is enough information available from either of the real-time information 820 or the historical information available in the log database 835 to suggest that a repair utility should be engaged immediately. This situation is described with reference to FIG. 9.

Figure 9:
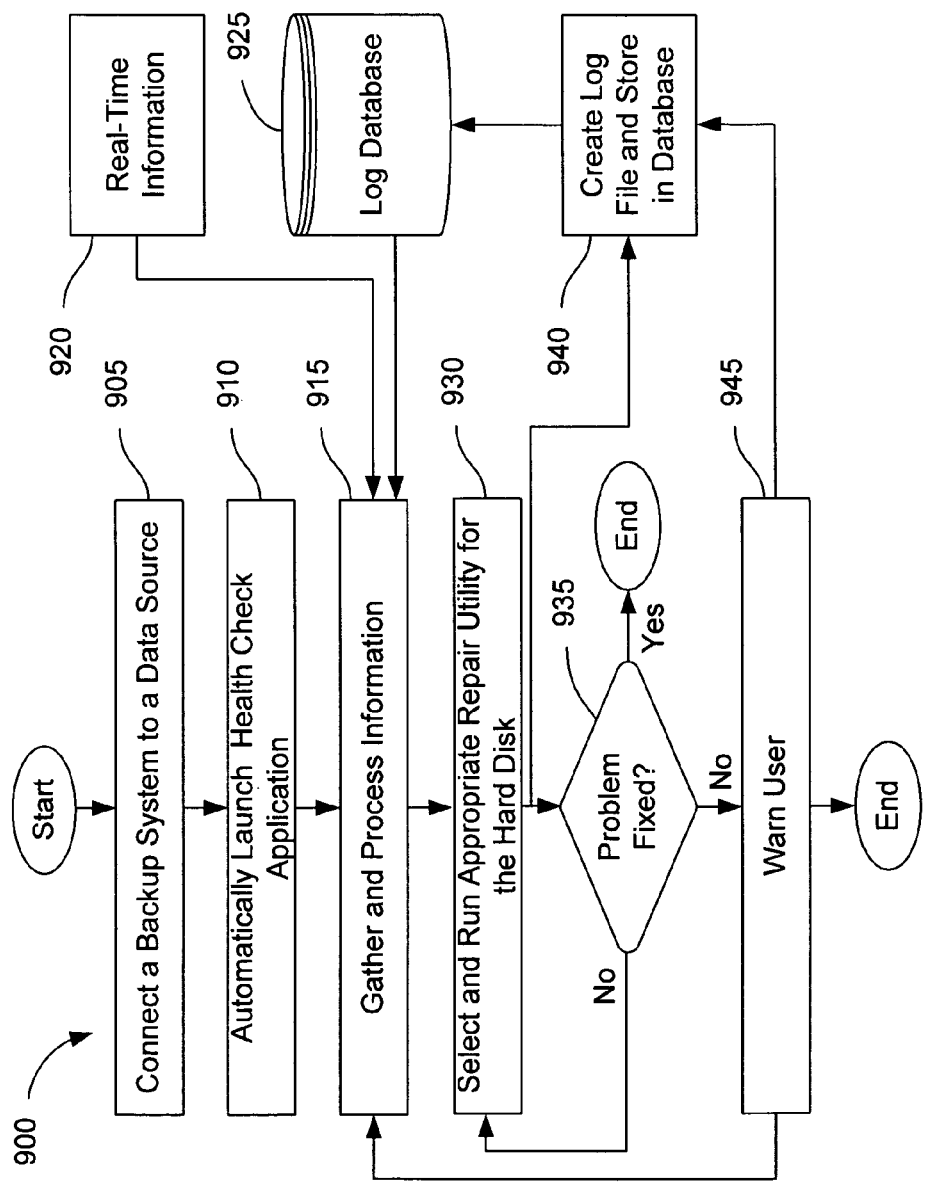
FIG. 9 is a flow-chart representation of a method for diagnosing a system and implementing an appropriate response according to another exemplary embodiment of the present invention.

FIG. 9 shows a flow-chart representation of still another exemplary method 900 for diagnosing a backup system and implementing an appropriate response thereto. As with methods 600 and 800, while the method 900 is described with reference to a backup system, the method is equally applicable to any system that can emulate an auto-launch device. Similar to methods 600 and 800, the method 900 comprises connecting 905 a backup system to a data source, automatically launching 910 a health check application, and gathering and processing 915 information. Again, the information comes from two sources, real-time information 920 and a log database 925. The real-time information 920 can comprise, for example, information from the SMART utility. The log database 925 provides log files 700 (FIG. 7) of historical information.

As suggested above, in some instances gathering and processing 915 information will indicate a repair should be performed, thus, a repair utility that is appropriate for the hard disk and the indicated problem is selected and run 930. As above, a log file 940 is created and stored to the log database 925. If the repair utility is not successful and the problem is still detected 935, either another utility can be selected and run 930, or the user can be warned 945 with an appropriate warning displayed on a display device of the data source. Optionally, the health check application can also return to gathering and processing 915 information to try again. In either event, another log file 940 is created and stored to the log database 925. If the selected utility is able to repair the problem, and no problem is detected 935, a log file 940 is again created, and the method 900 can terminate. Although not shown in FIG. 9, in some embodiments, if the repair is successful, the method 900 returns to gathering and processing 915 information to verify that no further problems exist.

In some instances, real-time information 920 that is gathered and processed 915 will indicate the necessity to bypass the repair utility and progress directly to warning 945 the user. For example, a normal operating temperature range for the HDD storage device 500 is 5° C. to 40° C. and the SMART utility reports a consistent temperature of 42° C. over a certain period of time. As in method 800, warning 945 the user can further comprise powering down the backup system to allow the backup system to cool.

Figure 10:
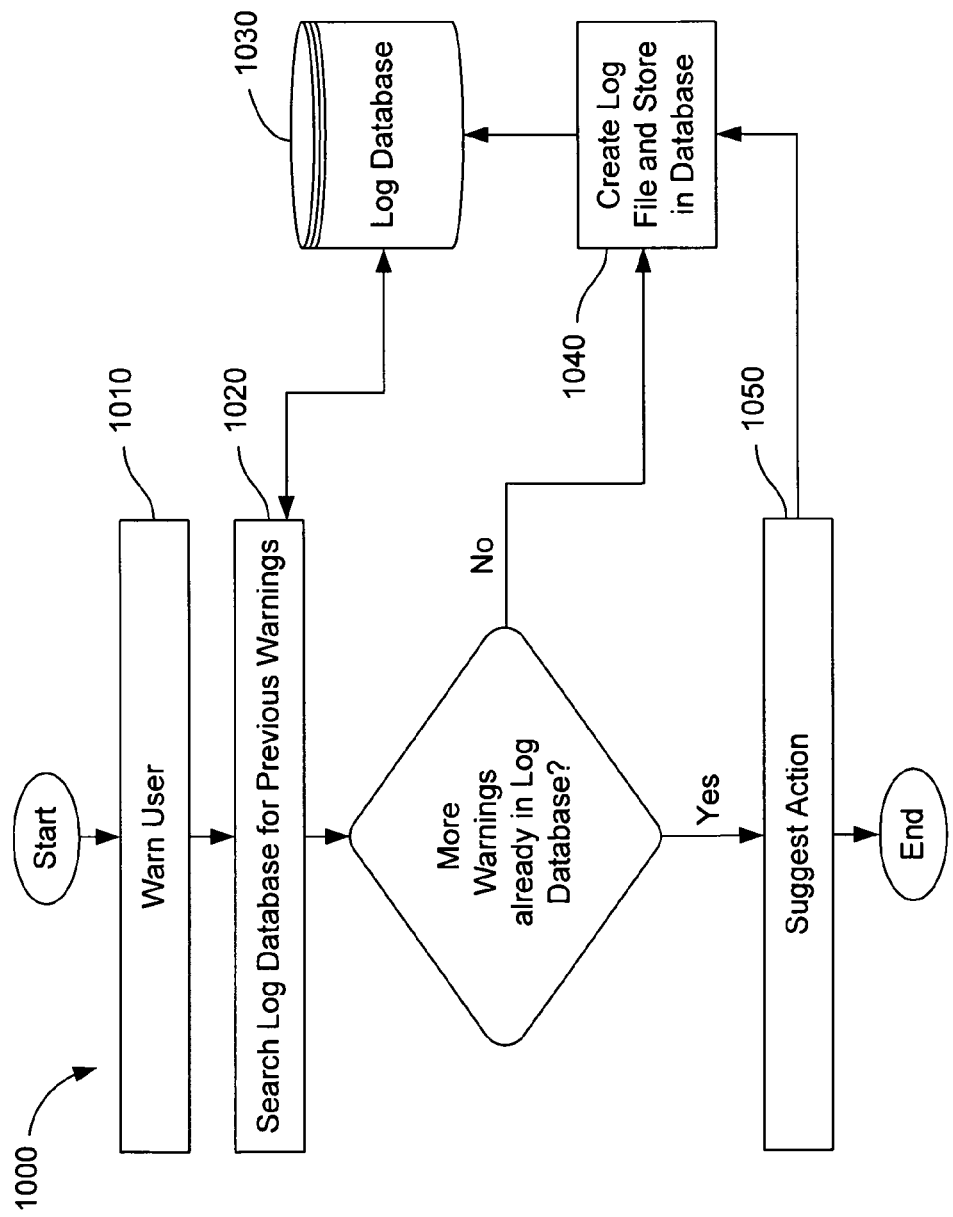
FIG. 10 is a flow-chart representation of a method for suggesting an action to a user based on a history of warnings according to an exemplary embodiment of the present invention.

FIG. 10 shows a flow-chart representation of still another exemplary method 1000. The method 1000 begins by warning 1010 a user, as for the reasons described above. In method 1000 the health check application searches 1020 the Log Database 1030 for previous warnings, of either the same or a different type than the warning issued by warning 1010 the user. If other historical warnings are identified, and the number of warnings does not exceed a threshold, a log file 1040 is created and stored to the log database 1030. If the number of previous warnings does exceed the threshold, an action is suggested 1050 to the user and again a log file 1040 is created and stored. The suggested action is appropriate to the hard disk and the problem that triggered warning 1010 the user.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system comprising:
a communication interface;
a storage device including computer-readable instructions of a health check application; and
an emulation component in communication between the storage device and the communication interface and configured to:
represent the storage device as an auto-launch device;
receive auto-launch device commands from a data source addressed to the auto-launch device, translate the auto-launch device commands to storage device commands, and send the storage device commands to the storage device, and
receive storage device responses from the storage device, translate the storage device responses into auto-launch device responses, and send the auto-launch device responses to the data source.

2. The system of claim 1 wherein the communication interface comprises a USB communication interface.

3. The system of claim 1 wherein the communication interface comprises a Fire Wire communication interface.

4. The system of claim 1 wherein the storage device comprises a HDD.

5. The system of claim 1 wherein the storage device further includes computer-readable instructions of a backup application.

6. The system of claim 1 further comprising a controller chip in communication between the storage device and the communication interface.

7. The system of claim 6 wherein the emulation component resides on the controller chip.

8. The system of claim 6 wherein the controller chip comprises firmware including additional computer-readable instructions of the health check application.

9. A system comprising:
a communication interface;
a storage device;
a printed circuit board comprising a component in communication between the storage device and the communication interface and including computer-readable instructions of a health check application; and
an emulation component in communication between the storage device and the communication interface and configured to:
represent the storage device as an auto-launch device;
receive auto-launch device commands from a data source addressed to the auto-launch device, translate the auto-launch device commands to storage device commands, and send the storage device commands to the storage device, and receive storage device responses from the storage device, translate the storage device responses into auto-launch device responses, and send the auto-launch device responses to the data source.

10. The system of claim 9 wherein the storage device comprises additional computer-readable instructions of the health check application.

* * * * *